US012363664B2

United States Patent
Ghanbarinejad et al.

(10) Patent No.: US 12,363,664 B2
(45) Date of Patent: Jul. 15, 2025

(54) POSITIONING IN A NON-TERRESTRIAL NETWORK

(71) Applicant: Lenovo (Singapore) Pte. Limited, Singapore (SG)

(72) Inventors: Majid Ghanbarinejad, Chicago, IL (US); Robin Thomas, Frankfurt am Main (DE); Sher Ali Cheema, Ilmenau (DE)

(73) Assignee: LENOVO (SINGAPORE) PTE. LTD., Singapore (SG)

( * ) Notice: Subject to any disclaimer, the term of this patent is extended or adjusted under 35 U.S.C. 154(b) by 670 days.

(21) Appl. No.: 17/554,916

(22) Filed: Dec. 17, 2021

(65) Prior Publication Data
US 2023/0199685 A1 Jun. 22, 2023

(51) Int. Cl.
H04W 56/00 (2009.01)
H04W 72/0446 (2023.01)
H04W 72/21 (2023.01)

(52) U.S. Cl.
CPC ..... *H04W 56/004* (2013.01); *H04W 72/0446* (2013.01); *H04W 72/21* (2023.01)

(58) Field of Classification Search
CPC ........................... H04W 56/004; H04W 72/21; H04W 72/0446
See application file for complete search history.

(56) References Cited

U.S. PATENT DOCUMENTS

| 11,963,129 | B2 | 4/2024 | Cheema et al. |
| 12,022,422 | B2 | 6/2024 | Ghanbarinejad et al. |
| 12,276,743 | B2 | 4/2025 | Thomas et al. |
| 2008/0177430 | A1 | 7/2008 | Tekawy et al. |

(Continued)

FOREIGN PATENT DOCUMENTS

| WO | 2013181264 A1 | 12/2013 |
| WO | 2021155578 A1 | 8/2021 |

OTHER PUBLICATIONS

"5G System (5GS) Location Services (LCS)", 3rd Generation Partnership Project; Technical Specification Group Services and System Aspects, 3GPP TS 23.273 V17.2.0, 3GPP Organizational Partners, Valbonne, France [retrieved Feb. 2, 2022]. Retrieved from the Internet <http://www.3gpp.org>., Sep. 2021, 99 pages.

(Continued)

*Primary Examiner* — Christopher B Robinson
*Assistant Examiner* — Angela Widhalm De Rodriguez
(74) *Attorney, Agent, or Firm* — FIG.1 Patents

(57) ABSTRACT

Various aspects of the present disclosure relate to a user equipment (UE) that receives first control signaling indicating position information associated with a non-terrestrial station (NTS), the position information including an altitude of the NTS, a distance between the NTS and the apparatus, and/or an indication of a timing delay between the NTS and the apparatus. The UE also receives second control signaling indicating a first configuration identifying a first reference signal occasion. The UE determines a temporal range of an expected reference signal time difference duration based in part on the position information and the first configuration, and receives a reference signal during the temporal range of the expected reference signal time difference duration.

20 Claims, 18 Drawing Sheets

(56) References Cited

U.S. PATENT DOCUMENTS

| | | | |
|---|---|---|---|
| 2011/0117924 A1* | 5/2011 | Brunner | G01S 19/47 |
| | | | 455/456.1 |
| 2013/0257648 A1 | 10/2013 | Garin et al. | |
| 2014/0292564 A1 | 10/2014 | Park et al. | |
| 2015/0018010 A1 | 1/2015 | Fischer | |
| 2015/0382318 A1 | 12/2015 | Kim et al. | |
| 2017/0168163 A1* | 6/2017 | Small | G01S 1/024 |
| 2018/0048444 A1 | 2/2018 | Park et al. | |
| 2021/0144539 A1 | 5/2021 | Edge et al. | |
| 2021/0239783 A1 | 8/2021 | Calcev et al. | |
| 2021/0306869 A1 | 9/2021 | Wei et al. | |
| 2021/0328737 A1* | 10/2021 | Manolakos | H04L 27/2662 |
| 2021/0360753 A1* | 11/2021 | Manolakos | H04W 64/006 |
| 2022/0095258 A1* | 3/2022 | Yeo | H04B 7/18513 |
| 2022/0408497 A1 | 12/2022 | Matsuda et al. | |
| 2023/0051054 A1 | 2/2023 | Ma et al. | |
| 2023/0194649 A1 | 6/2023 | Thomas et al. | |
| 2023/0199694 A1 | 6/2023 | Ghanbarinejad et al. | |
| 2023/0199701 A1 | 6/2023 | Cheema et al. | |

OTHER PUBLICATIONS

"Evolved Universal Terrestrial Radio Access (E-UTRA): Physical channels and modulation", 3rd Generation Partnership Project, Technical Specification Group Radio Access Network, 3GPP TS 36.211 V16.7.0, 3GPP Organizational Partners, Valbonne, France [retrieved Feb. 2, 2022]. Retrieved from the Internet <http://www.3gpp.org>., Sep. 2021, 249 pages.
"LTE Positioning Protocol (LPP)", 3rd Generation Partnership Project, Technical Specification Group Radio Access Network, 3GPP TS 37.355 V16.4.0, 3GPP Organizational Partners, Valbonne, France [retrieved Feb. 2, 2022]. Retrieved from the Internet <http://www.3gpp.org>., Mar. 2021, 298 pages.
"LTE Positioning Protocol (LPP)", 3rd Generation Partnership Project, Technical Specification Group Radio Access Network, 3GPP TS 37.355 V16.6.0, 3GPP Organizational Partners, Valbonne, France [retrieved Feb. 2, 2022]. Retrieved from the Internet <http://www.3gpp.org>., Sep. 2021, 299 pages.
"NG Radio Access Network (NG-RAN): Stage 2 functional specification of User Equipment (UE) positioning in NG-RAN", 3rd Generation Partnership Project, Technical Specification Group Radio Access Network, 3GPP TS 38.305 V16.6.0, 3GPP Organizational Partners, Valbonne, France [retrieved Feb. 2, 2022]. Retrieved from the Internet <http://www.3gpp.org>., Sep. 2021, 120 pages.
"NG-RAN: Architecture description", 3rd Generation Partnership Project, Technical Specification Group Radio Access Network, 3GPP TS 38.401 V16.7.0, 3GPP Organizational Partners, Valbonne, France [retrieved Feb. 2, 2022]. Retrieved from the Internet <http://www.3gpp.org>., Oct. 2021, 79 pages.
"NG-RAN: NR Positioning Protocol A (NRPPa)", 3rd Generation Partnership Project, Technical Specification Group Radio Access Network, 3GPP TS 38.455 V16.5.0, 3GPP Organizational Partners, Valbonne, France [retrieved Feb. 2, 2022]. Retrieved from the Internet <http://www.3gpp.org>., Oct. 2021, 152 pages.
"NR: Physical layer measurements", 3rd Generation Partnership Project, Technical Specification Group Radio Access Network, 3GPP TS 38.215 V16.3.0, 3GPP Organizational Partners, Valbonne, France [retrieved Feb. 2, 2022]. Retrieved from the Internet <http://www.3gpp.org>., Sep. 2020, 25 pages.
"Procedures for the 5G System (5GS)", 3rd Generation Partnership Project, Technical Specification Group Services and System Aspects, 3GPP TS 23.502 V17.2.1, 3GPP Organizational Partners, Valbonne, France [retrieved Feb. 2, 2022]. Retrieved from the Internet <http://www.3gpp.org>., Sep. 2021, 712 pages.
"System architecture for the 5G System (5GS)", 3rd Generation Partnership Project; Technical Specification Group Services and System Aspects, 3GPP TS 23.501 V17.2.0, 3GPP Organizational Partners, Valbonne, France [retrieved Feb. 2, 2022]. Retrieved from the Internet <http://www.3gpp.org>., Sep. 2021, 542 pages.

Cheema, Sher et al., U.S. Appl. No. 63/121,475, filed Dec. 4, 2020, 42 pages.
Cheema, Sher Ali et al., U.S. Appl. No. 17/554,689, filed Dec. 17, 2021, 68 pages.
Ghanbarinejad, Majid et al., U.S. Appl. No. 17/555,164, filed Dec. 17, 2021, 87 pages.
Thomas, Robin et al., U.S. Appl. No. 17/554,583, filed Dec. 17, 2021, 80 pages.
Guidotti, A., et al., "Architectures, standardisation, and procedures for 5G Satellite Communications: A survey", Computer Networks, vol. 183 [retrieved Feb. 3, 2023]. Retrieved from the Internet <https://doi.org/10.1016/j.comnet.2020.107588>, Dec. 24, 2020, 18 pages.
Lenovo, Motorola Mobility, "Positioning Latency Reduction Enhancements", 3GPP TSG RAN WG2 Meeting#115-e, R2-2108127 [retrieved May 3, 2023]. Retrieved from the Internet <https://www.3gpp.org/ftp/tsg_ran/WG2_RL2/TSGR2_115-e/Docs>., Aug. 2021, 11 Pages.
PCT/IB2022/062251, "International Search Report and Written Opinion", PCT Application No. PCT/IB2022/062251, Mar. 3, 2023, 12 pages.
PCT/IB2022/062257, "International Search Report and Written Opinion", PCT Application No. PCT/IB2022/062257, Mar. 13, 2023, 16 pages.
PCT/IB2022/062333, "International Search Report and Written Opinion", PCT Application No. PCT/IB2022/062333, Mar. 16, 2023, 6 pages.
PCT/IB2022/062336, "International Search Report and Written Opinion", PCT Application No. PCT/IB2022/062336, May 9, 2023, 16 pages.
ZTE, et al., "Discussion on positioning latency reduction", 3GPP TSG-RAN WG2 Meeting #116 electronic, R2-2109460, Online [retrieved May 3, 2023]. Retrieved from the Internet <https://www.3gpp.org/ftp/tsg_ran/WG2_RL2/TSGR2_116-e/Docs>., Nov. 2021, 6 Pages.
ZTE Corporation, et al., "Consideration on system information and cell (re)selection in NTN", 3GPP TSG-RAN WG2 Meeting#111, R2-2006872, Electronic [retrieved Mar. 16, 2023]. Retrieved from the Internet <https://www.3gpp.org/ftp/tsg_ran/WG2_RL2/TSGR2_111-e/Docs>, Aug. 2020, 6 pages.
U.S. Appl. No. 17/554,689, "Notice of Allowance", U.S. Appl. No. 17/554,689, Dec. 4, 2023, 7 pages.
U.S. Appl. No. 17/555,164, "Notice of Allowance", U.S. Appl. No. 17/555,164, Feb. 14, 2024, 8 pages.
U.S. Appl. No. 17/554,689, "Non-Final Office Action", U.S. Appl. No. 17/554,689, Aug. 30, 2023, 16 pages.
U.S. Appl. No. 17/554,689, "Corrected Notice of Allowability", U.S. Appl. No. 17/554,689, Mar. 13, 2024, 2 pages.
U.S. Appl. No. 17/555,164, "Corrected Notice of Allowability", U.S. Appl. No. 17/555,164, May 23, 2024, 2 pages.
U.S. Appl. No. 17/554,583, "Non-Final Office Action", U.S. Appl. No. 17/554,583, Jun. 20, 2024, 10 pages.
Ericsson, "Updates for R16 LTE Mobility Enhancements and LTE updates for R16 NR Mobility Enhancements", 3GPP TSG-RAN WG2 Meeting #110-e, R2-2005757, Electronic meeting, Jun. 2020, 1051 pages.
PCT/IB2022/062251, "International Preliminary Report on Patentability", International Application No. PCT/IB2022/062251, Jun. 27, 2024, 9 pages.
PCT/IB2022/062257, "International Preliminary Report on Patentability", International Application No. PCT/IB2022/062257, Jun. 27, 2024, 12 pages.
PCT/IB2022/062333, "International Search Report and Written Opinion", International Application No. PCT/IB2022/062333, Jun. 27, 2024, 11 pages.
PCT/IB2022/062336, "International Preliminary Report on Patentability", International Application No. PCT/IB2022/062336, Jun. 27, 2024, 11 pages.
"Corrected Notice of Allowability", U.S. Appl. No. 17/554,583, Jan. 15, 2025, 5 pages.
"Notice of Allowance", U.S. Appl. No. 17/554,583, Dec. 10, 2024, 9 pages.

(56) References Cited

OTHER PUBLICATIONS

"Corrected Notice of Allowability", U.S. Appl. No. 17/554,583, filed Mar. 17, 2025, 3 pages.

* cited by examiner

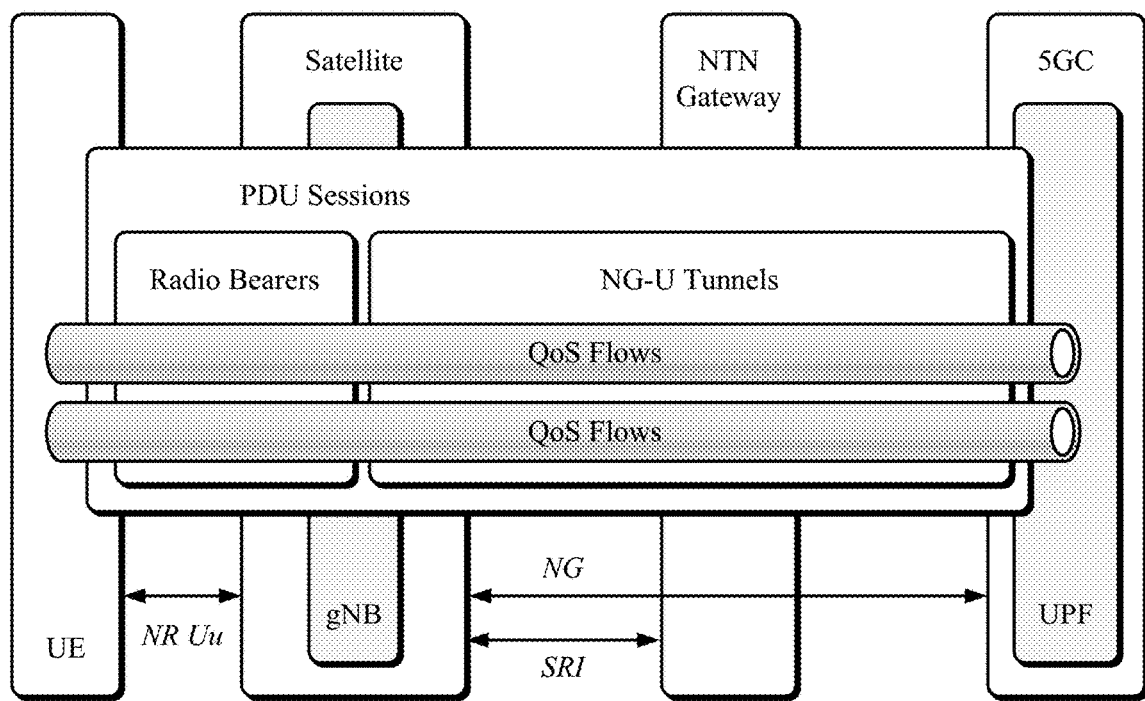
FIG. 13 — 1300
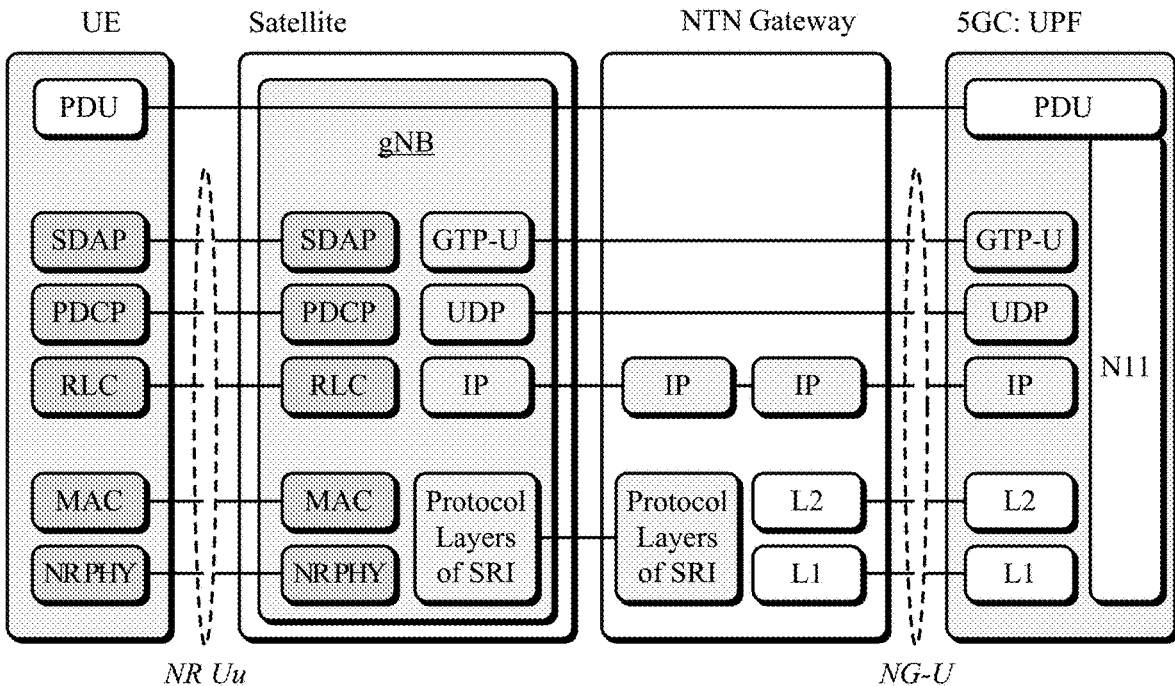
FIG. 14 — 1400

POSITIONING IN A NON-TERRESTRIAL NETWORK

TECHNICAL FIELD

The present disclosure relates to wireless communications, and more specifically to positioning in a non-terrestrial network (NTN).

BACKGROUND

A wireless communications system may include one or multiple network communication devices, such as base stations, which may be otherwise known as an eNodeB (eNB), a next-generation NodeB (gNB), or other suitable terminology. Each network communication device, such as a base station, may support wireless communications for one or multiple user communication devices, which may be otherwise known as user equipment (UE), or other suitable terminology. The wireless communications system may support wireless communications with one or multiple user communication devices by utilizing resources of the wireless communication system, such as time resources (e.g., symbols, subslots, slots, subframes, frames, or the like) or frequency resources (e.g., subcarriers, carriers). Additionally, the wireless communications system may support wireless communications across various radio access technologies (RATs) including third generation (3G) RAT, fourth generation (4G) RAT, fifth generation (5G) RAT, and other suitable RATs beyond 5G.

In some cases, a wireless communications system may be an NTN, which may support various communication devices to support wireless communications in the NTN. For example, an NTN may include network entities onboard non-terrestrial vehicles such as satellites, unmanned aerial vehicles (UAV), and high-altitude platforms systems (HAPS), as well as network entities on the ground, such as gateway entities capable of transmitting and receiving over long distances. In a positioning system for an NTN, one or more location servers, or components of the location servers, may communicate with one or multiple UEs connected to the NTN over a wireless medium. In some cases, in an NTN, propagation delays can be orders of magnitude longer than those in a typical terrestrial network (TN). Additionally, satellites or any other non-terrestrial transmit-receive points (NT-TRPs) may be moving at high speeds, for example in the case of low-earth orbit (LEO) and medium-earth orbit (MEO) satellite systems. Other non-terrestrial systems, such as geosynchronous satellite systems, may also introduce wireless communication challenges due to NT-TRP movements.

SUMMARY

The present disclosure relates to methods, apparatuses, and systems that enable a communication device (e.g., a UE, a base station, a network entity) to perform measurement of reference signals (such as, positioning reference signals (PRS)) and reporting of positioning information of the communication device in an NTN. For example, the communication device may be configured with a PRS configuration, and the communication device may perform PRS measurement and reporting of positioning information according to RAT-dependent positioning operations in an NTN. In some implementations, the communication device may receive the PRS configuration from a location server configured with a location management function (LMF). The PRS configuration may include one or more parameters for supporting accurate measurement and reporting of positioning information of the communication device in a low-latency manner, accounting for moving TRPs, higher Doppler shift, and long propagation delays in the NTN.

By supporting measurement and reporting according to RAT-dependent positioning operations in an NTN, a communication device may verify its location and perform optimized low-latency radio positioning. For example, a communication device, such as UE in wireless communication with a satellite in an NTN may report location using onboard devices, which needs to be verified by the network using RAT-dependent positioning methods. Additionally, by supporting measurement and reporting according to RAT-dependent positioning operations in an NTN, a communication device may experience improved NTN positioning in rural and remote areas, where cellular TRPs are otherwise rare, intermittent, or non-existent. Additionally, satellites in LEO and MEO systems travel on predictable trajectories and at high speeds, causing a significant Doppler effect in signals received on the ground, which may also be taken into account for positioning enhancements.

In aspects of the disclosure for positioning in an NTN, an expected RSTD window is computed based on information corresponding to satellite altitude and other ephemeris information about a satellite. In a typical TN system, there is no need to obtain a search window because propagation delays are within a smaller range and do not introduce uncertainties in round trip time (RTT) signaling between network entities. However, in an NTN, Doppler-based configuration and signaling can be implemented, based on an air interface such as a 5G new radio (NR) air interface, and a new NTN-based multi-RTT procedure enhances the timing of the sounding reference signal (SRS) transmission in order to take into account highly variable propagation delays from UE in an NTN serving cell. The proposed signaling can be utilized to determine a reference signal occasion, and to perform Doppler measurements to assist with NTN positioning. A delay can also be configured or signaled such that a user equipment applies the delay between the reception and transmission of reference signals for multi-round trip time (RTT) positioning. Aspects of the present disclosure include configuration, adaptation, and/or enhancements of next generation radio access network (NG-RAN) signaling in an NTN. The enhanced signaling can take into account any type of NTN entity and the associated configuration data for the entity.

Some implementations of the method and apparatuses described herein may further include positioning at a user equipment in an NTN. The user equipment includes a receiver to receive first control signaling indicating position information associated with a non-terrestrial station, the position information including one or more of an altitude of the non-terrestrial station (NTS), a distance between the NTS and the user equipment, or an indication of a timing delay between the NTS and the user equipment. The user equipment also receives second control signaling indicating a first configuration identifying a first reference signal occasion. The user equipment determines a temporal range of an expected reference signal time difference duration based in part on the position information and the first configuration, and receives a reference signal during the temporal range of the expected reference signal time difference duration.

Some implementations of the method and apparatuses described herein may further include positioning at a UE in an NTN. The UE includes a receiver to receive a reference signal lacking Doppler pre-compensation, and receive control signaling indicating position information associated with a NTS, the position information including one or more of a location of the NTS, a velocity of the NTS, or a distance between the NTS and the UE. The UE determines a Doppler frequency of the reference signal based in part on the position information associated with the NTS. The UE also obtains an estimate of a position of the UE with respect to the NTS based in part on the determined Doppler frequency.

Some implementations of the method and apparatuses described herein may further include positioning signaling at a location server, which includes a receiver to receive first control signaling indicating first configuration information in a downlink reference signal associated with a NTS. The location server also receives second control signaling indicating second configuration information in an uplink reference signal associated with a UE, and receives third control signaling indicating a first configuration of a propagation delay and a delay drift rate associated with a timing delay of the positioning signaling between the NTS and the UE. The location server obtains a transmission time based in part on the reception time of the first reference signal, the propagation delay, and the delay drift rate. The location server then transmits the uplink reference signal to the NTS at the transmission time.

BRIEF DESCRIPTION OF THE DRAWINGS

Various aspects of the present disclosure for positioning in an NTN are described with reference to the following Figures. The same numbers may be used throughout to reference like features and components shown in the Figures.

FIG. 3 illustrates an example of assistance data configuration with respect to UE measurement and report configuration signaling, adaptable for positioning in an NTN in accordance with aspects of the present disclosure.

FIG. 4 illustrates an example of a positioning measurement report with respect to UE measurement and report configuration signaling, adaptable for positioning in an NTN in accordance with aspects of the present disclosure.

FIG. 13 illustrates an example of a regenerative satellite-based NG-RAN architecture with gNB onboard, adaptable for positioning in an NTN in accordance with aspects of the present disclosure.

FIG. 14 illustrates an example of the UE user plane protocol stack for a protocol data unit (PDU) session, with respect to the regenerative satellite-based NG-RAN architecture with the gNB onboard, adaptable for positioning in an NTN in accordance with aspects of the present disclosure.

DETAILED DESCRIPTION

Figure 1:
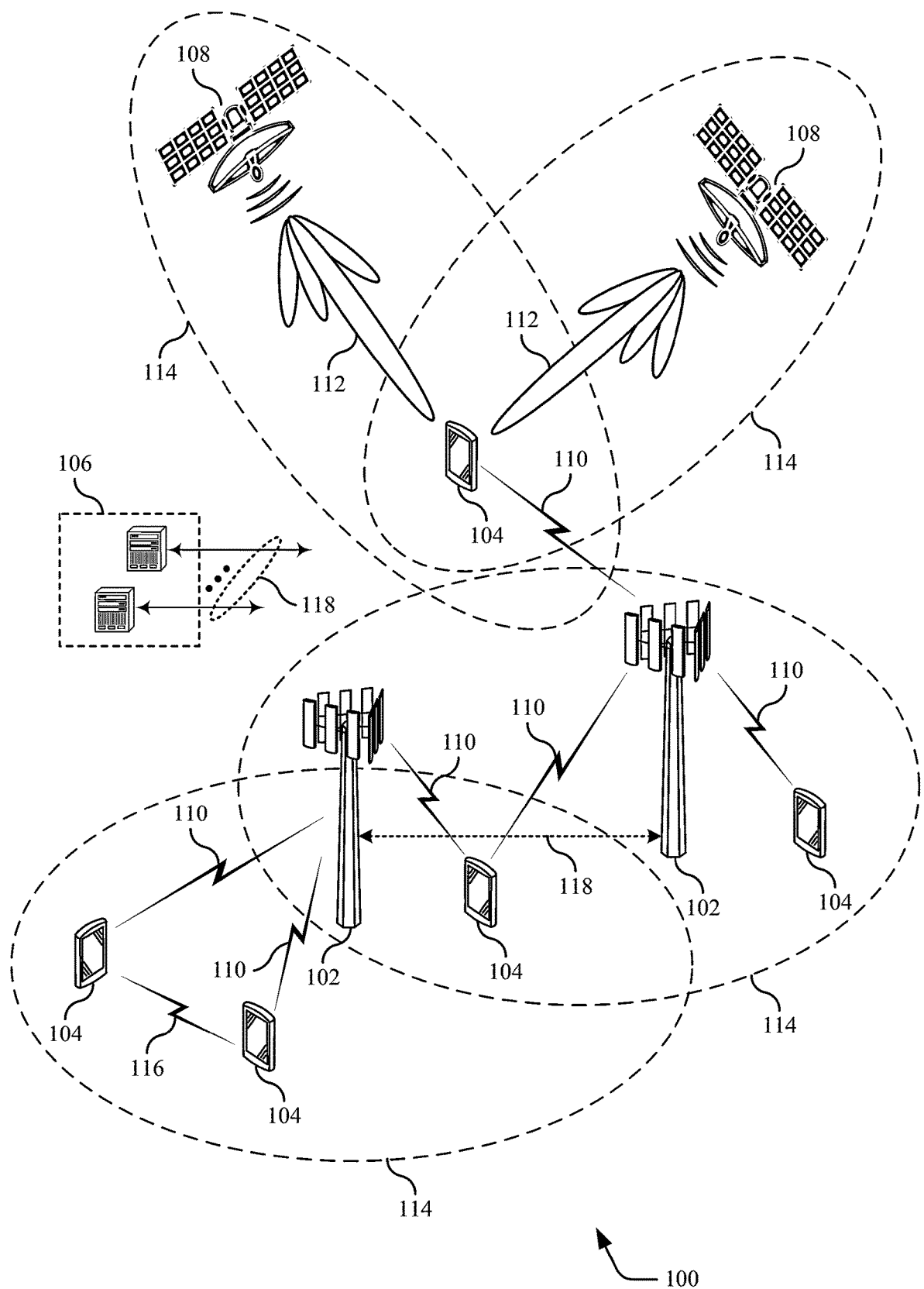
FIG. 1 illustrates an example of a wireless communications system that supports positioning in an NTN in accordance with aspects of the present disclosure.

Implementations of positioning in an NTN are described, such as related to PRS configuration, measurement, processing, and reporting utilizing RAT-dependent positioning for UE connected to an NTN. The configuration signaling parameters from a location server that implements a LMF are adapted to facilitate a target UE being able to report accurate positioning measurements in a low-latency manner, taking into consideration the moving TRPs, higher Doppler shift, and long propagation delays. The present disclosure provides configuration, reporting, and signaling enhancements to support the RAT-dependent positioning procedures over an NTN using 3GPP NR technology and radio access node (RAN) functionality that supports signaling procedures to enable the RAT NR positioning.

An NTN can include satellites and gateway entities transmitting and receiving over long distances with location servers and UE connected to the NTN for wireless communications. Notably, the moving TRPs, higher Doppler shift, and long propagation delays add levels of complexity to enable wireless communications utilizing NG-RAN technology in an NTN. Procedures for PRS configuration, measurement, processing, and reporting are lacking for NTN entities, such as for satellites and gateway network entities in the third-generation partnership project (3GPP) positioning architecture. Further, regulatory and emergency services requirements need to be addressed, so that configured PRS resources and reported positioning measurements are conveyed to a target UE in a timely manner, particularly given the RTT delays experienced in an NTN. For effective network-based positioning in an NTN, a location server that implements a LMF needs to receive the measurement report and location estimates from a UE in a low-latency manner, which introduces a challenge given the extended propagation times over which the positioning reports and estimates are communicated in an NTN.

The positioning processes in an NTN take into account several different considerations than those for typical TN positioning, such as the longer propagation delays, moving satellites in the case of LEO and/or MEO satellite systems, larger pathloss, uncertainty about the number of satellites in range at any particular moment, and so on. The positioning processes in an NTN also utilize different and/or additional positioning data than for TN positioning, such as ephemeris data related to satellite movements and satellite architecture information, such as an architecture based on a regenerative payload architecture (RPA) model or a transparent payload architecture (TPA) model. For typical TN positioning, the LMF does not need the non-terrestrial (NT)-related configuration information for a positioning process for a UE, given that TRPs are capable of positioning at network nodes with gNBs (base stations) that are typically static (e.g., non-moving), and their signal strength, communication capabilities, behaviors, etc. are more predictable. Whereas, in an NTN, the LMF may not have sufficient node information to configure signaling, particularly when a signaling failure may occur as the number of satellites in communication range changes dynamically.

In aspects of the disclosure for positioning in an NTN, an expected RSTD window is computed based on information corresponding to satellite altitude and other ephemeris information associated with a satellite. In a typical TN system, there is no need to obtain a search window because propagation delays are within a smaller range, e.g., in the order of a millisecond, and do not introduce significant uncertainties in RTT signaling between network entities. However, in an NTN, Doppler-based configuration and signaling can be employed, based on a NR air interface as proposed in this disclosure, and a new NTN-based multi-RTT procedure enhances the timing of the transmission of reference signals, such as SRS in order to take into account highly variable, or uncertain, propagation delays from UE in an NTN serving cell. The proposed signaling can be utilized to determine a reference signal occasion, and to perform Doppler measurements to assist with NTN positioning. A delay can also be configured or signaled such that a UE applies the delay between the reception and transmission of reference signals for multi-RTT positioning.

Aspects of the present disclosure include configuration, adaptation, and/or enhancements of NG-RAN signaling in an NTN. The enhanced signaling can take into account any type of NTN entity and the associated configuration information for the entity. As described herein, an NTN entity may also be referred to as any type of non-terrestrial station (NTS), which may be any type of TRPs, which may be onboard geostationary and/or geosynchronous (GEO) satellites, MEO satellites, LEO satellites, high-altitude platform systems (HAPS), unmanned aerial vehicles (UAV), aircraft, or any other vehicle travelling in the earth's atmosphere, orbiting in outer space, and similar type entities. Any entity referred to as a NTS in the present disclosure may be referring to a satellite, satellite access node, network node, NG-RAN node, non-terrestrial transmission-reception point (NT-TRP), NTN transmission point (TP), NTN reception point (RP), and the like.

Aspects of the present disclosure are described in the context of a wireless communications system. Aspects of the present disclosure are further illustrated and described with reference to device diagrams and flowcharts that relate to positioning in an NTN.

FIG. 1 illustrates an example of a wireless communications system 100 that supports positioning in an NTN in accordance with aspects of the present disclosure. The wireless communications system 100 may include one or more base stations 102, one or more UEs 104, a core network 106, and one or more NTSs 108, such as satellite access nodes. The wireless communications system 100 may support various radio access technologies. In some implementations, the wireless communications system 100 may be a 4G network, such as a LTE network or an LTE-A network. In some other implementations, the wireless communications system 100 may be a 5G network, such as a NR network. In other implementations, the wireless communications system 100 may be a combination of a 4G network and a 5G network. The wireless communications system 100 may support radio access technologies beyond 5G. Additionally, the wireless communications system 100 may support technologies, such as time division multiple access (TDMA), frequency division multiple access (FDMA), or code division multiple access (CDMA), etc.

The one or more base stations 102 may be dispersed throughout a geographic region to form the wireless communications system 100. One or more of the base stations 102 described herein may be or include or may be referred to as a base transceiver station, an access point, a NodeB, an eNB, a gNB, or other suitable terminology. A base station 102 and a UE 104 may communicate via a communication link 110, which may be a wireless or wired connection. For example, a base station 102 and a UE 104 may perform wireless communication over a NR-Uu interface. The one or more NTSs 108 described herein may be or include any type of TRPs (which may be onboard geostationary and/or geosynchronous satellites), MEO satellites, LEO satellites, HAPS, UAV, aircraft, or any other vehicle travelling in the earth's atmosphere, orbiting in outer space, and the like. Any entity referred to as a NTS in the present disclosure may be referring to a satellite, a satellite access node, NTN node, NG-RAN node, NT-TRP, NTN TP, NTN RP, and similar type entities. A NTS 108 and a UE 104 may communicate via a communication link 112, which may be a wireless connection via a transmission beam and/or a reception beam.

A base station 102 and/or a NTS 108 may provide a geographic coverage area 114 for which the base station 102 and/or NTS 108 may support services (e.g., voice, video, packet data, messaging, broadcast, etc.) for one or more UE 104 within the geographic coverage area. For example, a base station 102 and a UE 104 may support wireless communication of signals related to services (e.g., voice, video, packet data, messaging, broadcast, etc.) according to one or multiple radio access technologies. Similarly, a NTS 108 and a UE 104 may support wireless communication of signals related to services (e.g., voice, video, packet data, messaging, broadcast, etc.) according to one or multiple radio access technologies. In some implementations, a base station 102 may be moveable, such as when implemented as a gNB onboard a satellite associated with an NTN. In some implementations, different geographic coverage areas 114 associated with the same or different radio access technologies may overlap, and different geographic coverage areas 114 may be associated with different base stations 102 and/or with different NTSs 108. Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The one or more UEs 104 may be dispersed throughout a geographic region or coverage area 114 of the wireless communications system 100. A UE 104 may include or may be referred to as a mobile device, a wireless device, a remote device, a handheld device, or a subscriber device, or some other suitable terminology. In some implementations, the UE 104 may be referred to as a unit, a station, a terminal, or a client, among other examples. Additionally, or alternatively, a UE 104 may be referred to as an Internet-of-Things (IoT) device, an Internet-of-Everything (IoE) device, or machine-type communication (MTC) device, among other examples. In some implementations, a UE 104 may be stationary in the wireless communications system 100, such as a very small aperture terminal (VSAT), which may be connected to one or multiple other network nodes serving other UEs. In some other implementations, a UE 104 may be mobile in the wireless communications system 100, such as an earth station in motion (ESIM).

The one or more UEs 104 may be devices in different forms or having different capabilities. A UE 104 may be capable of communicating with various types of devices, such as the base stations 102, other UEs 104, NTSs 108, or network equipment (e.g., the core network 106, a relay device, a gateway device, an integrated access and backhaul (IAB) node, a location server that implements the LMF, or other network equipment). Additionally, or alternatively, a UE 104 may support communication with other base stations 102 or UE 104, which may act as relays in the wireless communications system 100.

A UE 104 may also support wireless communication directly with other UE 104 over a communication link 116. For example, a UE 104 may support wireless communication directly with another UE 104 over a device-to-device (D2D) communication link. In some implementations, such as vehicle-to-vehicle (V2V) deployments, vehicle-to-everything (V2X) deployments, or cellular-V2X deployments, the communication link 116 may be referred to as a sidelink. For example, a UE 104 may support wireless communication directly with another UE 104 over a PC5 interface.

A base station 102 may support communications with the core network 106, or with another base station 102, or both. For example, a base station 102 may interface with the core network 106 through one or more backhaul links 118 (e.g., via an S1, N2, or other network interface). The base stations 102 may communicate with each other over the backhaul links 118 (e.g., via an X2, Xn, or another network interface). In some implementations, the base stations 102 may communicate with each other directly (e.g., between the base stations 102). In some other implementations, the base stations 102 and/or NTSs 108 may communicate with each other indirectly (e.g., via the core network 106). In some implementations, one or more base stations 102 may include subcomponents, such as an access network entity, which may be an example of an access node controller (ANC). The ANC may communicate with the one or more UEs 104 through one or more other access network transmission entities, which may be referred to as a radio heads, smart radio heads, gateways, TRPs, and other network nodes and/or entities.

The core network 106 may support user authentication, access authorization, tracking, connectivity, and other access, routing, or mobility functions. The core network 106 may be an evolved packet core (EPC), or a 5G core (5GC), which may include a control plane entity that manages access and mobility (e.g., a mobility management entity (MME), an access and mobility management functions (AMF)), and a user plane entity that routes packets or interconnects to external networks (e.g., a serving gateway (S-GW), a Packet Data Network (PDN) gateway (P-GW), or a user plane function (UPF)). In some implementations, the control plane entity may manage non-access stratum (NAS) functions, such as mobility, authentication, and bearer management for the one or more UE 104 served by the one or more base stations 102 associated with the core network 106.

In at least one implementation, one or more of the UEs 104, the base stations 102, and/or one or more of the NTSs 108 are operable to implement various aspects of positioning in an NTN, as described herein. For instance, leveraging the described techniques, a UE 104 is operable to communicate with a NTS 108 to facilitate wireless communications. The positioning processes in an NTN take into account several different considerations than those for typical TN positioning, such as the longer propagation delays, moving satellites in the case of LEO and/or MEO satellite systems, larger pathloss, uncertainty about the number of satellites in range at any particular moment, and so on. The positioning processes in an NTN also utilizes different and/or additional positioning data than for TN positioning. In aspects of the disclosure, an expected RSTD window is computed based on information corresponding to satellite altitude and other ephemeris information about a satellite. Additionally, Doppler-based configuration and signaling can be utilized, and a new NTN-based multi-RTT procedure enhances the timing of the SRS transmission in order to take into account highly variable propagation delays from a UE in an NTN serving cell.

With reference to terrestrial networks (TNs), the 3GPP (release 17) defines the positioning performance requirements. For example, the positioning error requirement for end-to-end latency for a position estimate of a UE in a commercial use case is less than 100 ms, and in an IIOT use case is less than 100 ms, within the order of 10 ms being desired. However, these positioning performance requirements do not take into account the latency experienced in an NTN, and do not address obtaining a position estimate for a UE given the extended propagation delays, such as for signaling and communications between a UE and a NTS (e.g., a satellite).

In aspects of positioning in an NTN, various RAT-dependent positioning techniques (also referred to as positioning methods, or positioning procedures) are supported for a UE, for UE assisted, LMF-based, and/or for NG-RAN node assisted. Additionally, various RAT-independent positioning techniques, such as network-assisted global navigation satellite system (GNSS) methods, may also be utilized separately or in combination with the described RAT-dependent positioning techniques to determine the location of a UE. The RAT-dependent positioning techniques that are supported include downlink-time difference of arrival (DL-TDOA), downlink-angle of departure (DL-AoD), multi-RTT, new radio enhanced cell-ID (NR E-CID); uplink-time difference of arrival (UL-TDOA); and uplink-angle of arrival (UL-AoA).

The DL-TDOA positioning technique utilizes at least three network nodes for positioning based on triangulation. The DL-TDOA positioning method makes use of the downlink RSTD (and optionally DL PRS RSRP) of downlink signals received from multiple TPs at the UE. The UE measures the downlink RSTD (and optionally DL PRS RSRP) of the received signals using assistance data received from the positioning server (also referred to herein as the location server), and the resulting measurements are used along with other configuration information to locate the UE in relation to the neighboring TPs. In terms of 2D localization, three or more network nodes are required, while in the case of 3D location estimation, four or more network nodes are desirable, where nodes are TPs.

The DL-AoD positioning technique makes use of the measured downlink PRS reference signal received power (RSRP) (DL PRS RSRP) of downlink signals received from multiple TPs at the UE. The UE measures the DL PRS RSRP of the received signals using assistance data received from the positioning server (also referred to herein as the location server), and the resulting measurements are used along with other configuration information to locate the UE in relation to the neighboring TPs. The location estimate accuracy of the DL-AoD technique will also improve for N≥1 nodes.

Figure 2:
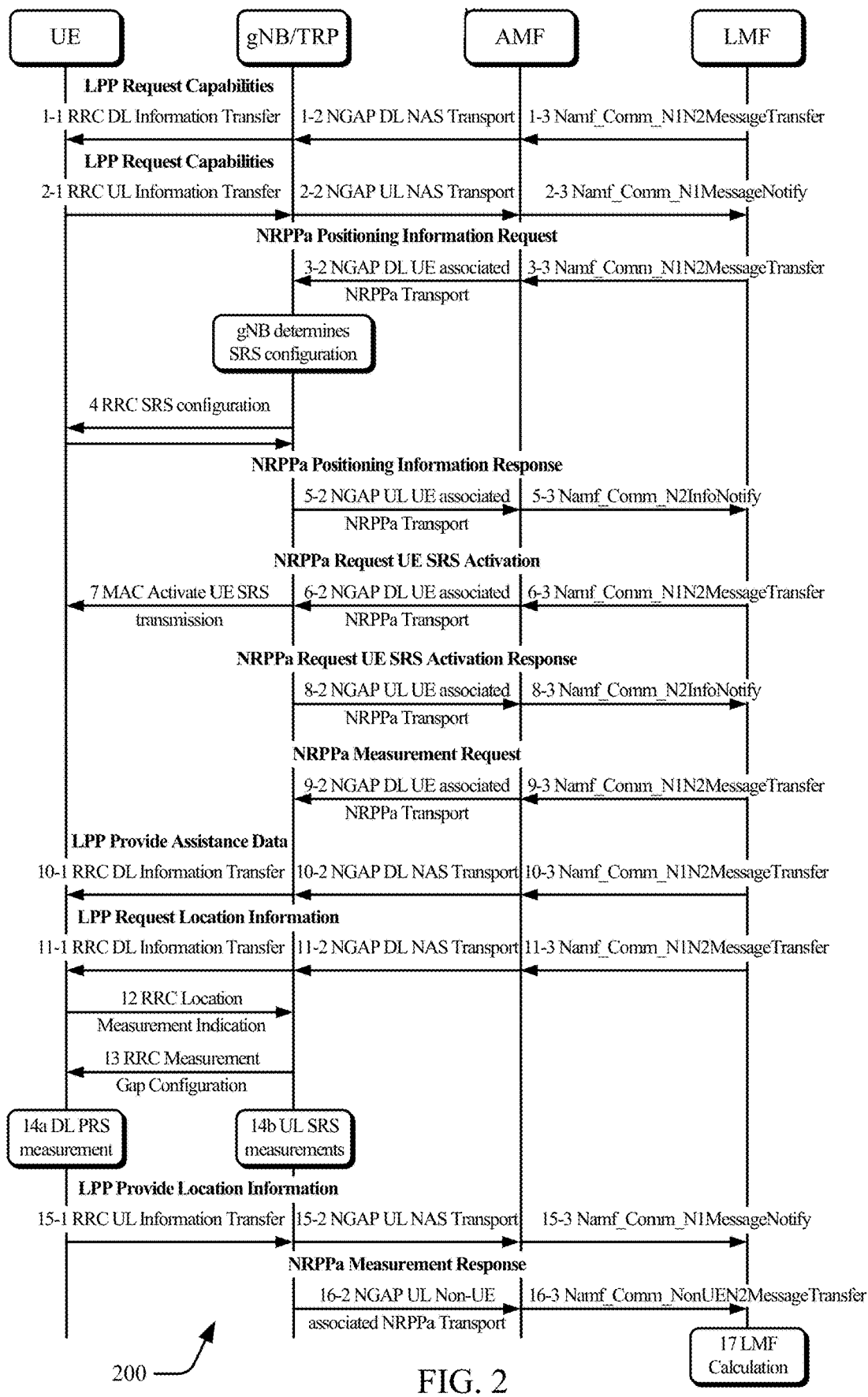
FIG. 2 illustrates an example of a signaling chart for the call flow for multi-RTT positioning, adaptable for positioning in an NTN in accordance with aspects of the present disclosure.

FIG. 2 illustrates an example 200 of a signaling chart for the call flow for multi-RTT positioning. The multi-RTT positioning technique makes use of the UE Rx-Tx measurements and downlink PRS RSRP of downlink signals received from multiple TRPs, as measured by the UE and the measured gNB Rx-Tx measurements and uplink SRS RSRP (UL SRS-RSRP) at multiple TRPs of uplink signals transmitted from UE. The UE measures the UE Rx-Tx measurements (and optionally DL PRS RSRP of the received signals) using assistance data received from the positioning server (also referred to herein as the location server), and the TRPs the gNB Rx-Tx measurements (and optionally UL SRS-RSRP of the received signals) using assistance data received from the positioning server. The measurements are used to determine the RTT at the positioning server, which are used to estimate the location of the UE. The location estimate accuracy of the multi-RTT positioning technique will also improve for N≥1 nodes.

For the NR E-CID positioning technique, the position of a UE is estimated with the knowledge of its serving next generation evolved NodeB (ng-eNB), gNB and cell, and is based on LTE signals. The information about the serving next generation evolved NodeB (ng-eNB), gNB and cell may be obtained by paging, registration, or other methods. The NR enhanced cell-ID (NR E-CID) positioning refers to techniques which use additional UE measurements and/or NR radio resources and other measurements to improve the UE location estimate using NR signals. Although enhanced cell-ID (E-CID) positioning may utilize some of the same measurements as the measurement control system in the radio resource control (RRC) protocol, the UE is not expected to make additional measurements for the sole purpose of positioning (i.e., the positioning procedures do not supply a measurement configuration or measurement control message, and the UE reports the measurements that it has available rather than being required to take additional measurement actions).

The UL-TDOA positioning technique makes use of the UL-TDOA (and optionally UL SRS-RSRP) at multiple RPs of uplink signals transmitted from UE. The RPs measure the UL-TDOA (and optionally UL SRS-RSRP) of the received signals using assistance data received from the positioning server, and the resulting measurements are used along with other configuration information to estimate the location of the UE. The location estimate accuracy of the UL-TDOA technique will also improve for N≥3 nodes.

The UL-AoA positioning technique makes use of the measured azimuth and the zenith of arrival at multiple RPs of uplink signals transmitted from UE. The RPs measure azimuth-AoA and zenith-AoA of the received signals using assistance data received from the positioning server (also referred to herein as the location server), and the resulting measurements are used along with other configuration information to estimate the location of the UE. The location estimate accuracy of the UL-AoA technique will also improve for N≥1 nodes.

With regard to positioning measurements and reference signals, a PRS that is transmitted on the downlink from a NTS can be locally associated with a PRS resource ID and resource set ID for a base station (e.g., TRP). Similarly, UE positioning measurements, such as RSTD and PRS RSRP measurements are made between beams (e.g., between a different pair of downlink positioning reference signal (DL PRS) resources or DL PRS resource sets) as opposed to different cells, as was the case in LTE. There are additional uplink positioning methods that a network can utilize to compute the location of a target UE. Tables T1 and T2 show the reference signal to measurements mapping for each of the supported RAT-dependent positioning techniques at the UE and gNB, respectively.

TABLE T1

UE measurements to enable RAT-dependent positioning techniques.

| DL/UL Reference Signals | UE Measurements | To facilitate support of the positioning techniques |
|---|---|---|
| Rel. 16 DL PRS | DL RSTD | DL-TDOA |
| Rel. 16 DL PRS | DL PRS RSRP | DL-TDOA, DL-AoD, Multi-RTT |
| Rel. 16 DL PRS/ Rel. 16 SRS for positioning | UE Rx-Tx time difference | Multi-RTT |
| Rel. 15 SSB/CSI-RS for RRM | SS-RSRP(RSRP for RRM), SS-RSRQ(for RRM), CSI-RSRP (for RRM), CSI-RSRQ (for RRM), SS-RSRPB (for RRM) | NR E-CID |

TABLE T2 gNB measurements to enable RAT-dependent positioning techniques

| DL/UL Reference Signals | gNB Measurements | To facilitate support of the positioning techniques |
|---|---|---|
| Rel. 16 SRS for positioning | UL RTOA | UL-TDOA |
| Rel. 16 SRS for positioning | UL SRS-REFERENCE SIGNAL RECEIVED POWER (RSRP) | UL-TDOA, UL-AoA, Multi-RTT |
| Rel. 16 SRS for positioning, Rel. 16 DL PRS | gNB Rx-Tx time difference | Multi-RTT |
| Rel. 16 SRS for positioning | AoA and ZoA | UL-AoA, Multi-RTT |

The RAT-dependent positioning techniques can utilize the 3GPP RAT and core network entities to perform the position estimation of the UE, which are differentiated from RAT-independent positioning techniques, which rely on GNSS, IMU sensor, WLAN, and Bluetooth technologies for performing target UE positioning. These aspects of NR downlink-based positioning are applicable, and can be extended and adapted for an NTN gNB. For example, the location server that implements the LMF is typically a component of the core network, but in aspects of the described disclosure, may be implemented with the gNB onboard a NTS, such as a satellite. In this implementation, positioning of the UE may be determined faster than if the LMF is ground-based at the core network.

Figures 3, 4:
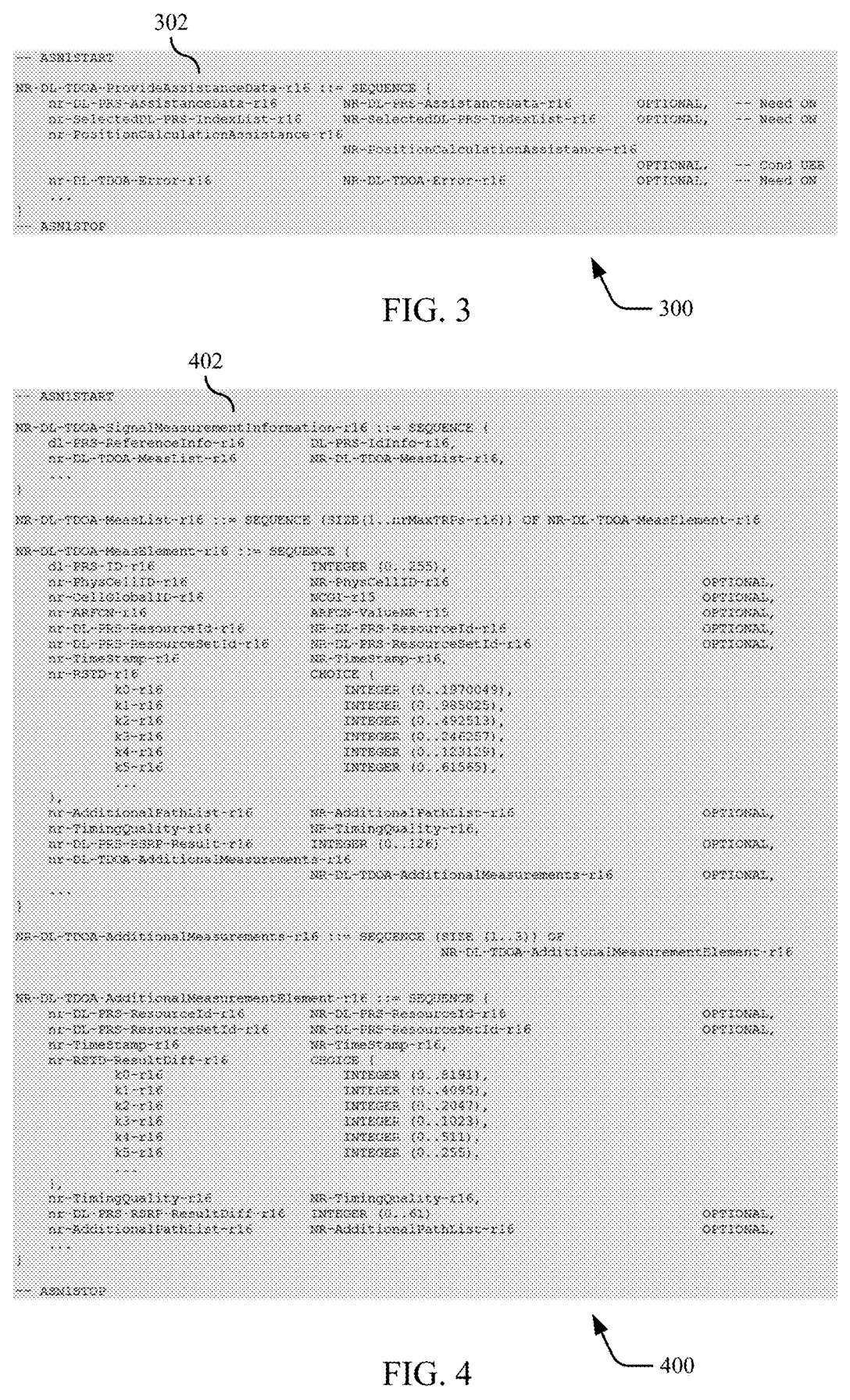

FIG. 3 illustrates an example 300 of assistance data configuration (current implementation Rel-16), with respect to UE measurement and report configuration signaling applicable to downlink-based positioning techniques. In the DL-TDOA assistance data, the information element (IE) NR-DL-TDOA-ProvideAssistanceData 302 is used by the location server to provide assistance data to enable UE-assisted and UE-based NR DL-TDOA, and may also be used to provide a NR DL-TDOA positioning specific error reason.

FIG. 4 illustrates an example 400 of a positioning measurement report (current implementation Rel-16), with respect to UE measurement and report configuration signaling applicable to downlink-based positioning techniques. In the DL-TDOA measurement report, the information element (IE) NR-DL-TDOA-SignalMeasurementInformation 402 is used by the target UE to provide NR DL-TDOA measurements to the location server. The measurements are provided as a list of TRPs, where the first TRP in the list is used as reference TRP in case RSTD measurements are reported. The first TRP in the list may or may not be the reference TRP indicated in the NR-DL-PRS-AssistanceData. Furthermore, the target UE selects a reference resource per the TRP, and compiles the measurements per the TRP based on the selected reference resource.

The different downlink measurements, including downlink PRS RSRP, downlink RSTD, and UE Rx-Tx time difference required for the supported RAT-dependent positioning techniques are shown in Table T3. The measurement configurations may include four (4) pair of downlink RSTD measurements performed per pair of cells, and each measurement is performed between a different pair of downlink PRS resources or resource sets with a single reference timing; and eight (8) downlink PRS reference signal received power (RSRP) measurements can be performed on different downlink PRS resources from the same cell.

TABLE T3

Downlink measurements for downlink-based positioning techniques.

| | DL PRS RSRP |
|---|---|
| Definition | DL PRS-RSRP, is the linear average over the power contributions (in [W]) of the resource elements that carry DL PRS reference signals configured for RSRP measurements within the considered measurement frequency bandwidth. For frequency range 1, the reference point for the DL PRS-RSRP shall be the antenna connector of the UE. For frequency range 2, DL PRS-RSRP shall be measured based on the combined signal from antenna elements corresponding to a given receiver branch. For frequency range 1 and 2, if receiver diversity is in use by the UE, the reported DL PRS-RSRP value shall not be lower than the corresponding DL PRS-RSRP of any of the individual receiver branches. |
| Applicable for | RRC_CONNECTED intra-frequency, RRC_CONNECTED inter-frequency |
| | DL reference signal time difference (DL RSTD) |
| Definition | DL reference signal time difference (DL RSTD) is the DL relative timing difference between the positioning node j and the reference positioning node i, defined as $T_{SubframeRxj} - T_{SubframeRxi}$, Where: $T_{SubframeRxj}$ is the time when the UE receives the start of one subframe from positioning node j. $T_{SubframeRxi}$ is the time when the UE receives the corresponding start of one subframe from positioning node i that is closest in time to the subframe received from positioning node j. Multiple DL PRS resources can be used to determine the start of one subframe from a positioning node. For frequency range 1, the reference point for the DL RSTD shall be the antenna connector of the UE. For frequency range 2, the reference point for the DL RSTD shall be the antenna of the UE. |
| Applicable for | RRC_CONNECTED intra-frequency RRC_CONNECTED inter-frequency |

TABLE T3-continued

Downlink measurements for downlink-based positioning techniques.

UE Rx-Tx time difference

| | |
|---|---|
| Definition | The UE Rx − Tx time difference is defined as $T_{UE\text{-}RX} - T_{UE\text{-}TX}$<br>Where:<br>$T_{UE\text{-}RX}$ is the UE received timing of downlink subframe #i from a positioning node, defined by the first detected path in time.<br>$T_{UE\text{-}TX}$ is the UE transmit timing of uplink subframe #j that is closest in time to the subframe #i received from the positioning node.<br>Multiple DL PRS resources can be used to determine the start of one subframe of the first arrival path of the positioning node.<br>For frequency range 1, the reference point for $T_{UE\text{-}RX}$ measurement shall be the Rx antenna connector of the UE and the reference point for $T_{UE\text{-}TX}$ measurement shall be the Tx antenna connector of the UE. For frequency range 2, the reference point for $T_{UE\text{-}RX}$ measurement shall be the Rx antenna of the UE and the reference point for $T_{UE\text{-}TX}$ measurement shall be the Tx antenna of the UE. |
| Applicable for | RRC_CONNECTED intra-frequency<br>RRC_CONNECTED inter-frequency |

Figure 5:
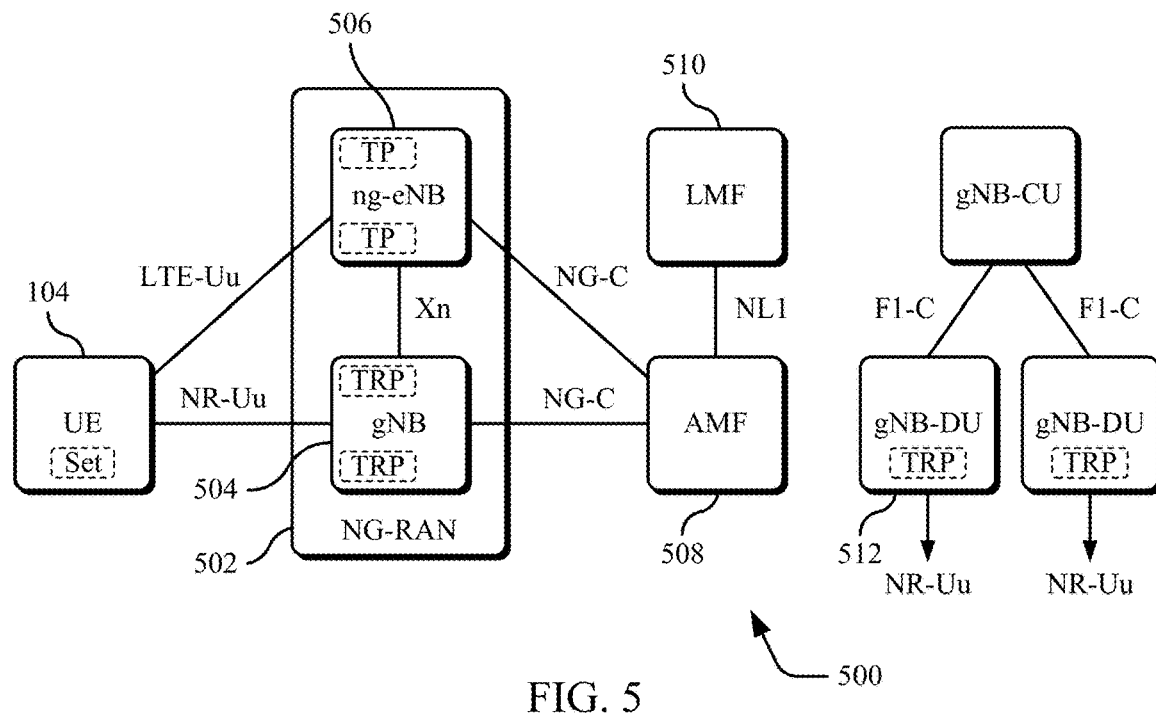
FIG. 5 illustrates an example network architecture applicable to NG-RAN for UE positioning as related to positioning in an NTN in accordance with aspects of the present disclosure.

FIG. 5 illustrates an example architecture 500 applicable to NG-RAN 502 for UE positioning. The NG-RAN 502 is capable of supporting both types of interfaces LTE-Uu and NR-Uu, and the gNB 504 may be implemented in an NTN architecture. The gNB 504 and an LTE next generation evolved NodeB (ng-eNB) 506 are connected by a Xn backhaul interface. The access and mobility management function (AMF) 508 may be transparent, or bypassed in an NTN architecture, and the LMF 510 provides the positioning techniques and configuration for UE positioning.

The AMF 508 may receive a request for some location service associated with a particular target UE 104 from another entity (e.g., a gateway mobile location center (GMLC) or UE), or the AMF itself decides to initiate some location service on behalf of a particular target UE, such as for an IP multimedia subsystem (IMS) emergency call from the UE. The AMF 508 then sends a location services request to the LMF 510. The LMF 510 processes the location services request which may include transferring assistance data to the target UE 104 to assist with UE-based and/or UE-assisted positioning and/or may include positioning of the target UE. The LMF 510 then returns the result of the location service back to the AMF 508 (e.g., a position estimate for the UE 104). In the case of a location service requested by an entity other than the AMF (e.g., requested by a GMLC or UE), the AMF 508 returns the location service result to this entity.

An NG-RAN node may control several TRPs and/or TPs, such as remote radio heads, or downlink PRS-only TPs for support of PRS-based terrestrial beacon system (TBS). A LMF 510 may have a proprietary signaling connection to an enhanced serving mobile location center (E-SMLC), which may enable the LMF 510 to access information from an evolved universal terrestrial radio access network (E-UTRAN) (e.g. to support the observed time difference of arrival (OTDOA) for a E-UTRA positioning method using downlink measurements obtained by a target UE of signals from next generation evolved NodeBs (ng-eNBs) and/or PRS-only TPs in E-UTRAN). A LMF 510 may have a proprietary signaling connection to a SUPL location platform (SLP). The SUPL location platform (SLP) is the secure user plane location (SUPL) entity responsible for positioning over the user plane. In the case of a split gNB architecture, a gNB-distributed unit (DU) 512 may include TRP functionality, where the TRP functionality may support functions for a TP, RP, or both. A gNB-DU 512 that includes TRP functionality does not need to offer cell services. To support positioning of a target UE and delivery of location assistance data to a UE with NG-RAN access in 5GS, location related functions are distributed as shown in the example architecture 400.

Figure 6:
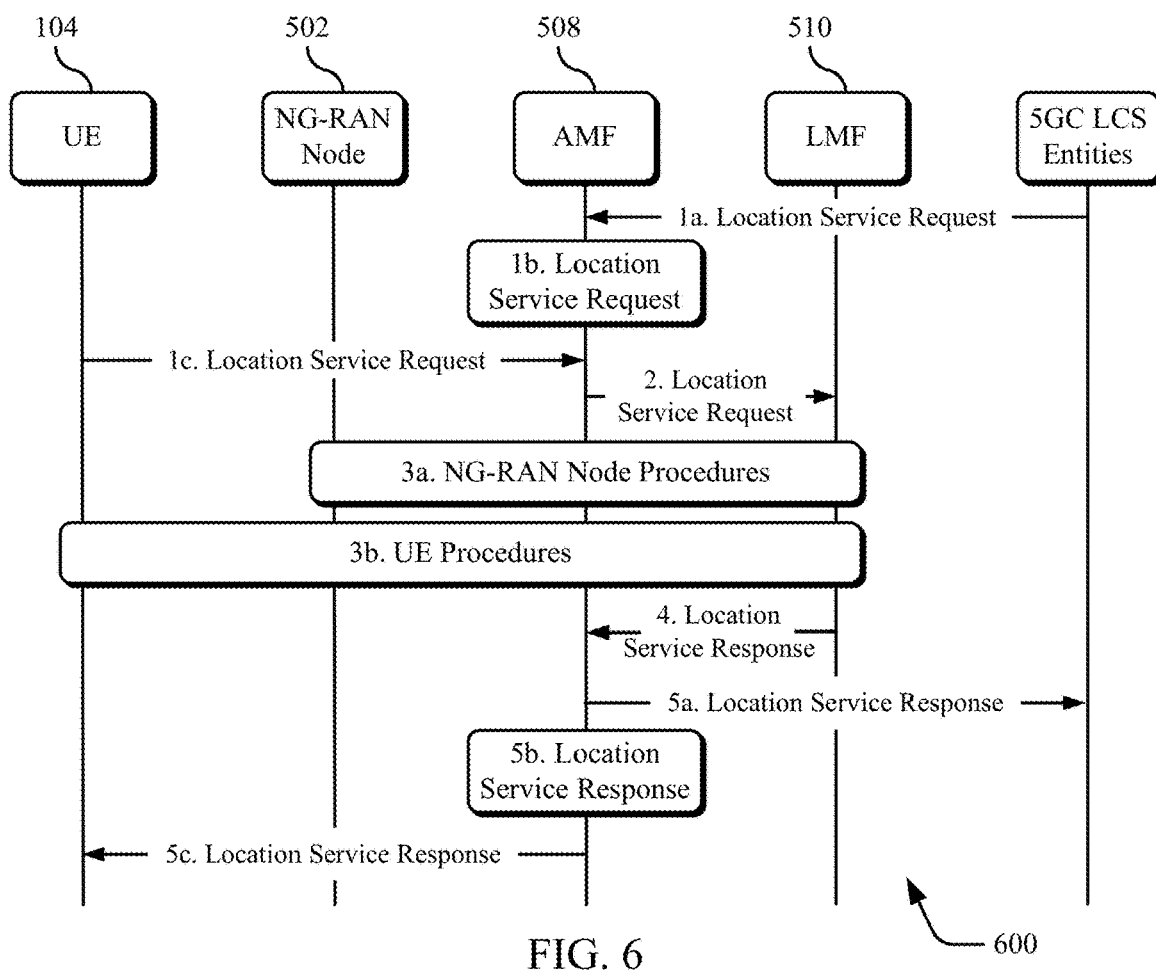
FIG. 6 illustrates an example signaling sequence applicable to NG-RAN for UE positioning as related to positioning in an NTN in accordance with aspects of the present disclosure.

FIG. 6 illustrates an overall sequence 600 of signaling events applicable to the UE 104, the NG-RAN 502, the AMF 508, and the LMF 510 for any location service. When the AMF 508 receives a location service request (LSR), and the UE 104 is in a connection management (CM)-idle state (CM-IDLE) state, the AMF 508 performs a network triggered service request in order to establish a signaling connection with the UE and assigns a specific serving gNB or next generation evolved NodeB (ng-eNB). The UE is assumed to be in a connected mode before the beginning of the signaling shown in the figure (i.e., signaling that may be needed to bring the UE to the connected mode prior to step 1a is not shown). However, the signaling connection may be later released, such as by the NG-RAN 502 node as a result of signaling and data inactivity while positioning is still ongoing. Additionally, the NG-RAN 502 node represents any combination of NTSs in an NTN, including a network architecture with a TN and NTN gNB, and/or a network architecture that is fully an NTN with NG-RAN architecture.

At step 1, either step 1a, step 1b, or step 1c is performed. At step 1a, an entity in the 5GC, such as a GMLC, requests a location service for positioning a target UE 104 to the serving AMF 508. Alternatively at step 1b, the serving AMF 508 for the target UE 104 determines the need for a location service (e.g. to locate the UE for an emergency call). Alternatively at step 1c, the UE 104 requests a location service, such as for the positioning or delivery of assistance data, to the serving AMF 508 at the non-access-stratum (NAS) level.

At step 2, the AMF 508 transfers the location service request to the LMF 510. At step 3a, the LMF 510 instigates location procedures with the serving and possibly neighboring next generation evolved NodeB (ng-eNB) or gNB in the NG-RAN 502, such as to obtain positioning measurements or assistance data. In addition to step 3a or alternatively (instead of step 3a), at step 3b, the LMF 510 instigates location procedures with the UE 104, such as to obtain a location estimate or positioning measurements, or to transfer location assistance data to the UE.

At step 4, the LMF 510 provides a location service response to the AMF 508 and includes any needed results, such as a success or failure indication and, if requested and obtained, a location estimate for the UE 104. At step 5*a* (if step 1*a* was performed), the AMF 508 returns a location service response to the 5GC entity in step 1*a* and includes any needed results, such as a location estimate for the UE 104. At step 5*b* (if step 1*b* occurred), the AMF 508 uses the location service response received in step 4 to assist the service that triggered this in step 1*b*, such as to provide a location estimate associated with an emergency call to a GMLC. At step 5*c* (if step 1*c* was performed), the AMF 508 returns a location service response to the UE 104 and includes any needed results, such as a location estimate for the UE.

In aspects of positioning in an NTN, the location procedures applicable to NG-RAN occur in steps 3*a* and 3*b*, which supports the configurations and reporting for communication between the LMF 510 and the UE 104 to enable NTN system level positioning. The steps 3*a* and 3*b* may involve the use of different positioning methods (also referred to herein as positioning techniques or positioning procedures) to obtain location related measurements for a target UE, and from these, the UE computes a location estimate and additional positioning assistance information.

Figure 7:
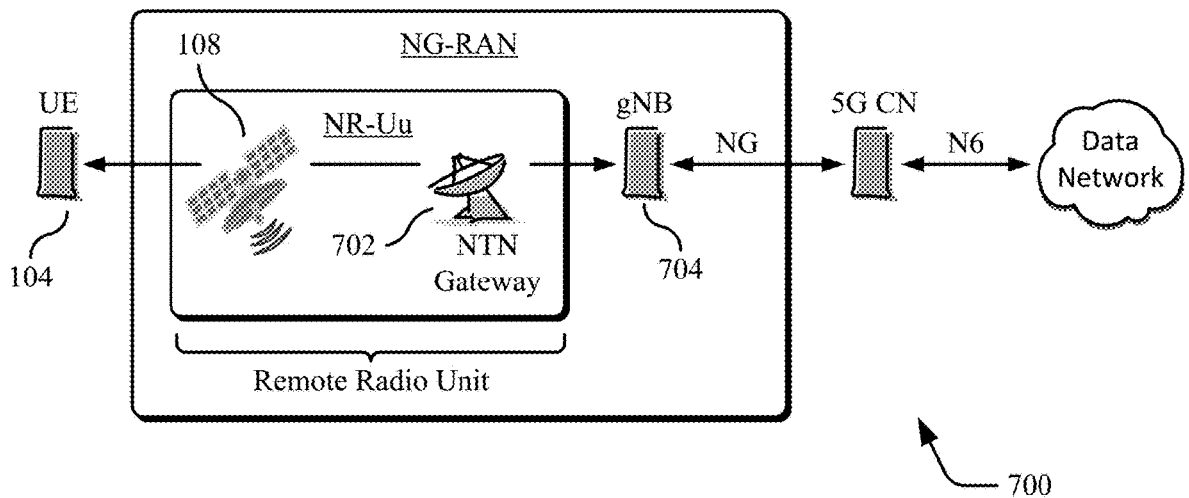
FIG. 7 illustrates an example transparent satellite-based NG-RAN architecture that supports positioning in an NTN in accordance with aspects of the present disclosure.

FIG. 7 illustrates a transparent satellite-based NG-RAN architecture 700. The satellite payload implements frequency conversion and a radio frequency amplifier in both the uplink and downlink directions, and it corresponds to an analogue RF repeater. Hence, the satellite (e.g., a NTS 108) repeats the NR-Uu radio interface from the feeder link, between the NTN gateway 702 and the satellite, to the service link between the satellite and the UE 104 (and vice-versa). The satellite radio interface (SRI) on the feeder link is the NR-Uu, meaning that the satellite does not terminate the NR-Uu radio interface. The NTN gateway 702 may support all of the necessary functions to forward the signal of the NR-Uu interface, and different transparent satellites may be connected to the same gNB 704 on the ground. Note that while several gNBs may access a single satellite payload, the illustration and description is simplified to the one gNB 704 accessing the satellite payload, without loss of generality.

Figure 8:
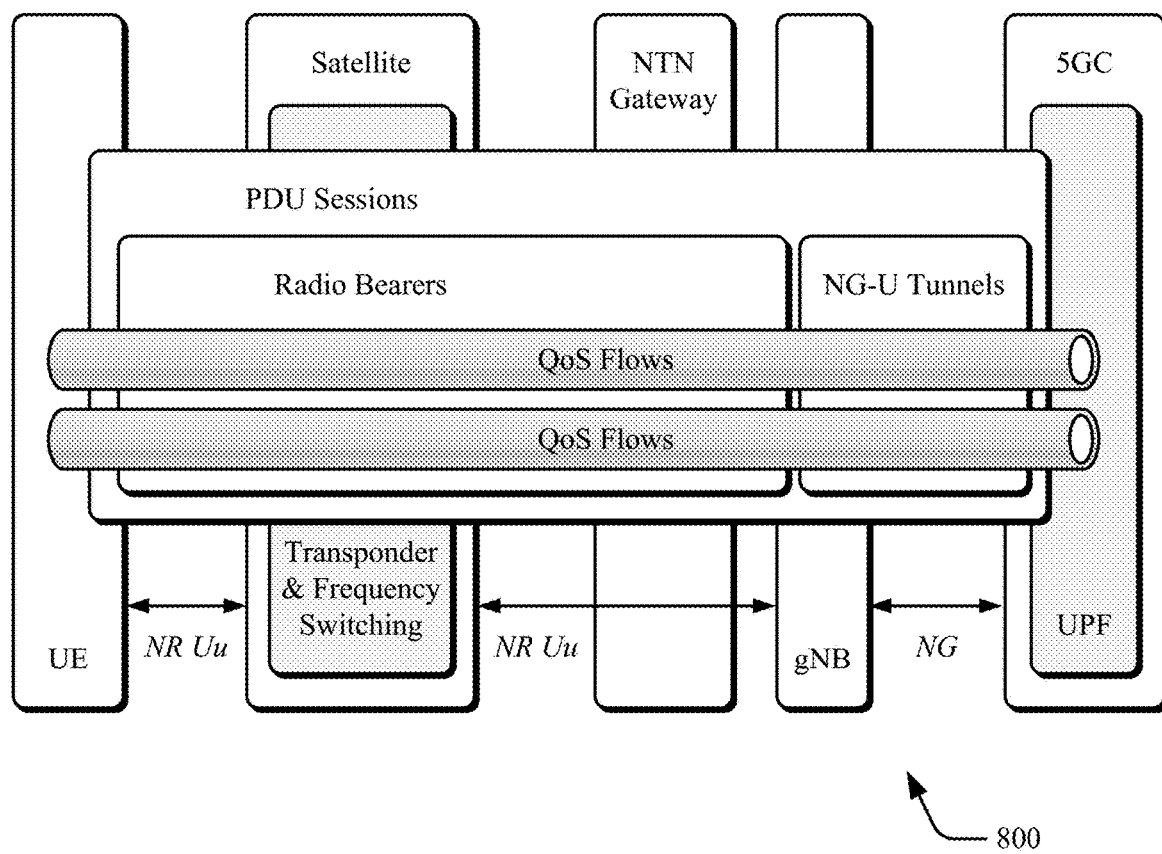
FIG. 8 illustrates an example of a transparent satellite-based NG-RAN architecture, adaptable for positioning in an NTN in accordance with aspects of the present disclosure.
Figure 9:
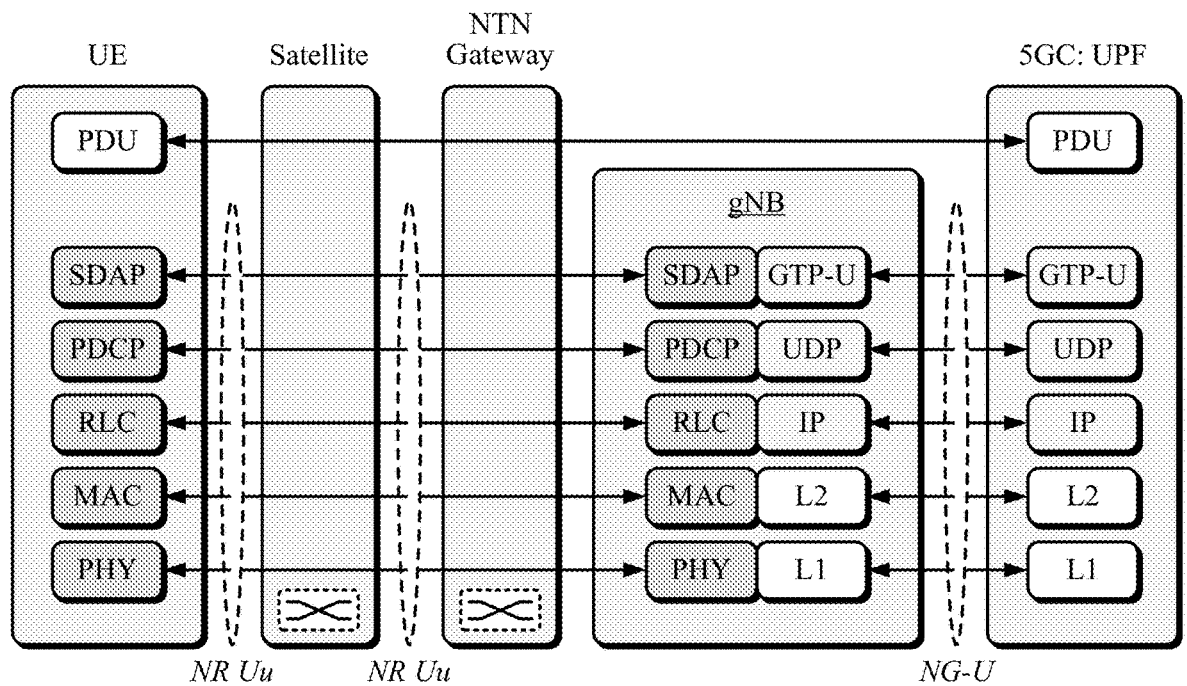
FIG. 9 illustrates an example of the UE user plane protocol stack for the transparent satellite-based NG-RAN architecture, adaptable for positioning in an NTN in accordance with aspects of the present disclosure.
Figure 10:
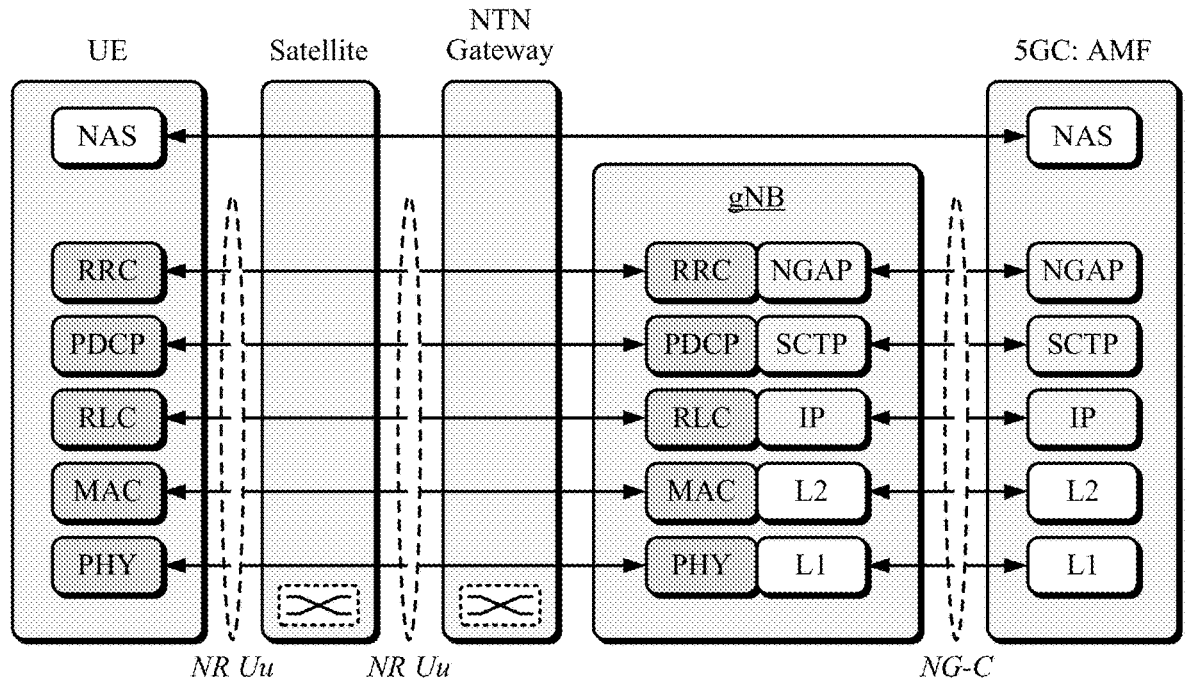
FIG. 10 illustrates an example of the control plane protocol stack for the transparent satellite-based NG-RAN architecture, adaptable for positioning in an NTN in accordance with aspects of the present disclosure.

FIG. 8 illustrates an example 800 of a transparent satellite-based NG-RAN architecture with mapping to quality of service (QOS) flows. The UE 104 has access to the 5G system via a 3GPP NR-based radio interface. FIG. 9 illustrates an example 900 of the UE user plane protocol stack for the transparent satellite-based NG-RAN architecture. The user data is transported between the UE 104 and the 5GC via the NTN gateway. FIG. 10 illustrates an example 1000 of the control plane protocol stack for the transparent satellite-based NG-RAN architecture. The non-access stratum (NAS) (NAS-SM and NAS-MM) signaling from the UE 104 and the NG-AP signaling from the gNB are transported toward the 5GC and vice-versa.

Figure 11:
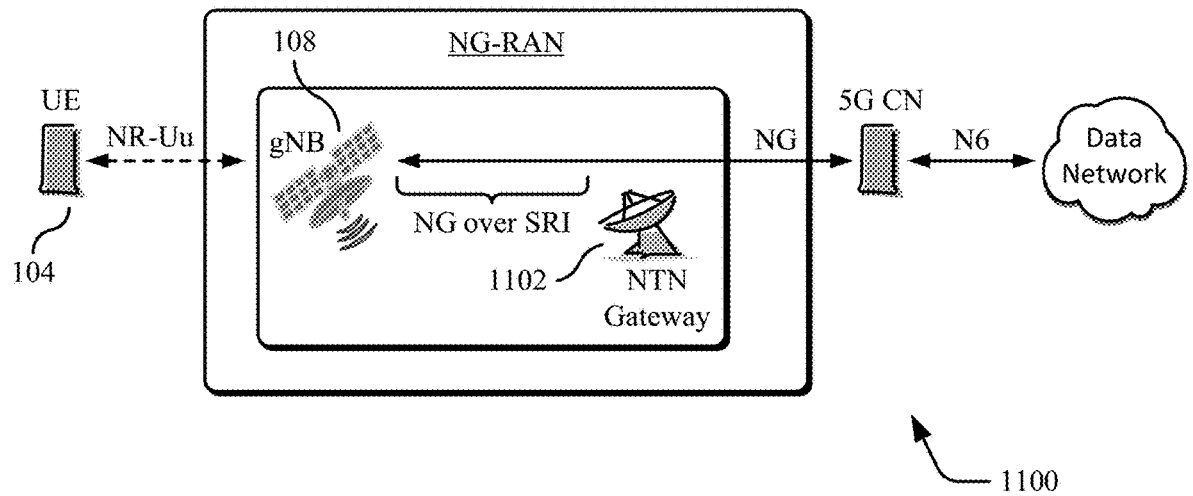
FIG. 11 illustrates an example regenerative satellite-based NG-RAN architecture that supports positioning in an NTN in accordance with aspects of the present disclosure.

FIG. 11 illustrates a regenerative satellite-based NG-RAN architecture 1100, such as a regenerative satellite without an inter-satellite link (ISL), and with a gNB-processed payload. The NG-RAN logical architecture may be used as baseline for an NTN. The satellite payload implements regeneration of the signals received from ground-based network nodes. In this architecture 1100, the NR-Uu radio interface is implemented on the service link between the UE 104 and the satellite (e.g., a NTS 108), and the satellite radio interface (SRI) is implemented on the feeder link between the NTN gateway 1102 and the satellite. The satellite radio interface (SRI) is a transport link between the NTN gateway 1102 and the satellite.

Figure 12:
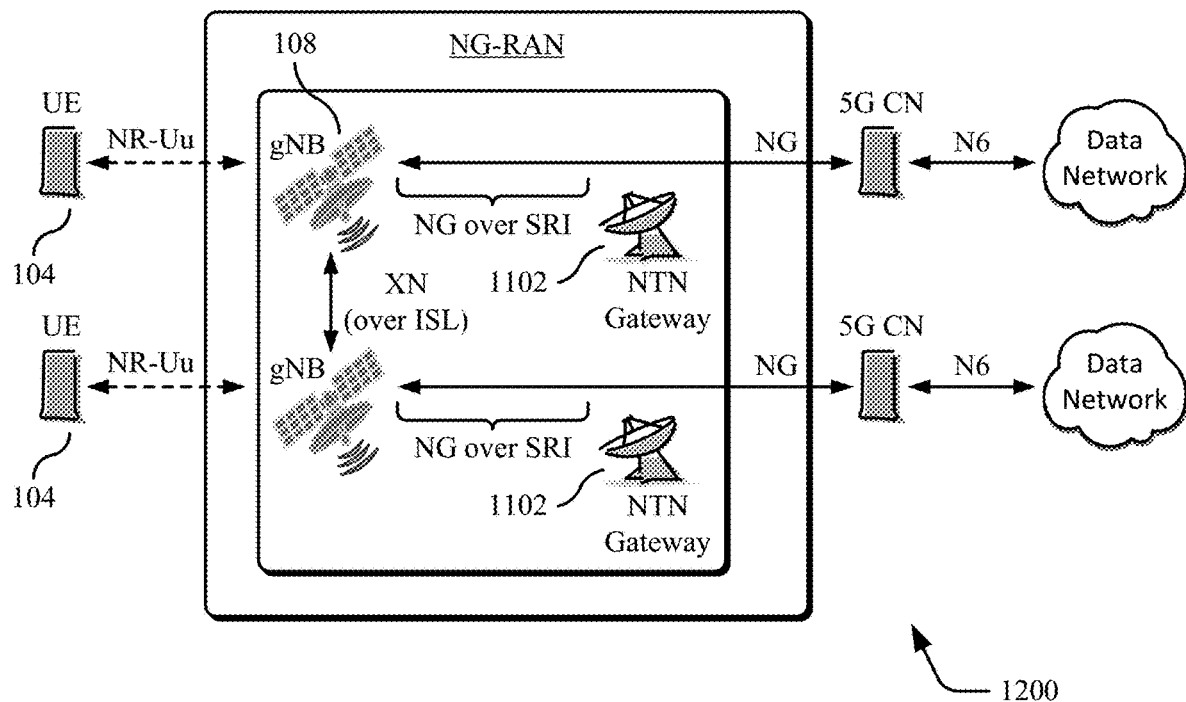
FIG. 12 illustrates another example regenerative satellite-based NG-RAN architecture that supports positioning in an NTN in accordance with aspects of the present disclosure.

FIG. 12 illustrates another example of a regenerative satellite-based NG-RAN architecture 1200, such as a regenerative satellite system with an inter-satellite link (ISL). The inter-satellite link (ISL) is a transport link, such as a radio interface or an optical interface, between satellites (e.g., NTSs 108). The NTN gateway 1102 is a transport network layer node, and supports all necessary transport protocols. In this architecture 1200, a UE 104 that is served by a gNB onboard a satellite could access the 5GCN via the inter-satellite link (ISL). In implementations, the gNB onboard different satellites may be connected to the same 5GCN on the ground, and if a satellite hosts more than one gNB, the same satellite radio interface (SRI) may be used to transport all the corresponding NG interface instances. In this architecture, the protocol stack of the satellite radio interface (SRI) is used to transport the UE user plane between a satellite and an NTN gateway 1102. The user protocol data units (PDUs) are transported over GTP-U tunnels between the 5GCN and the onboard gNB, via the NTN gateway 1102. The NG-AP is transported over SCTP, between the 5GCN and the onboard gNB via the NTN gateway. The NAS protocol is also transported by the NG-AP protocol, between the 5GCN and the onboard gNB, via the NTN gateway.

Figure 15:
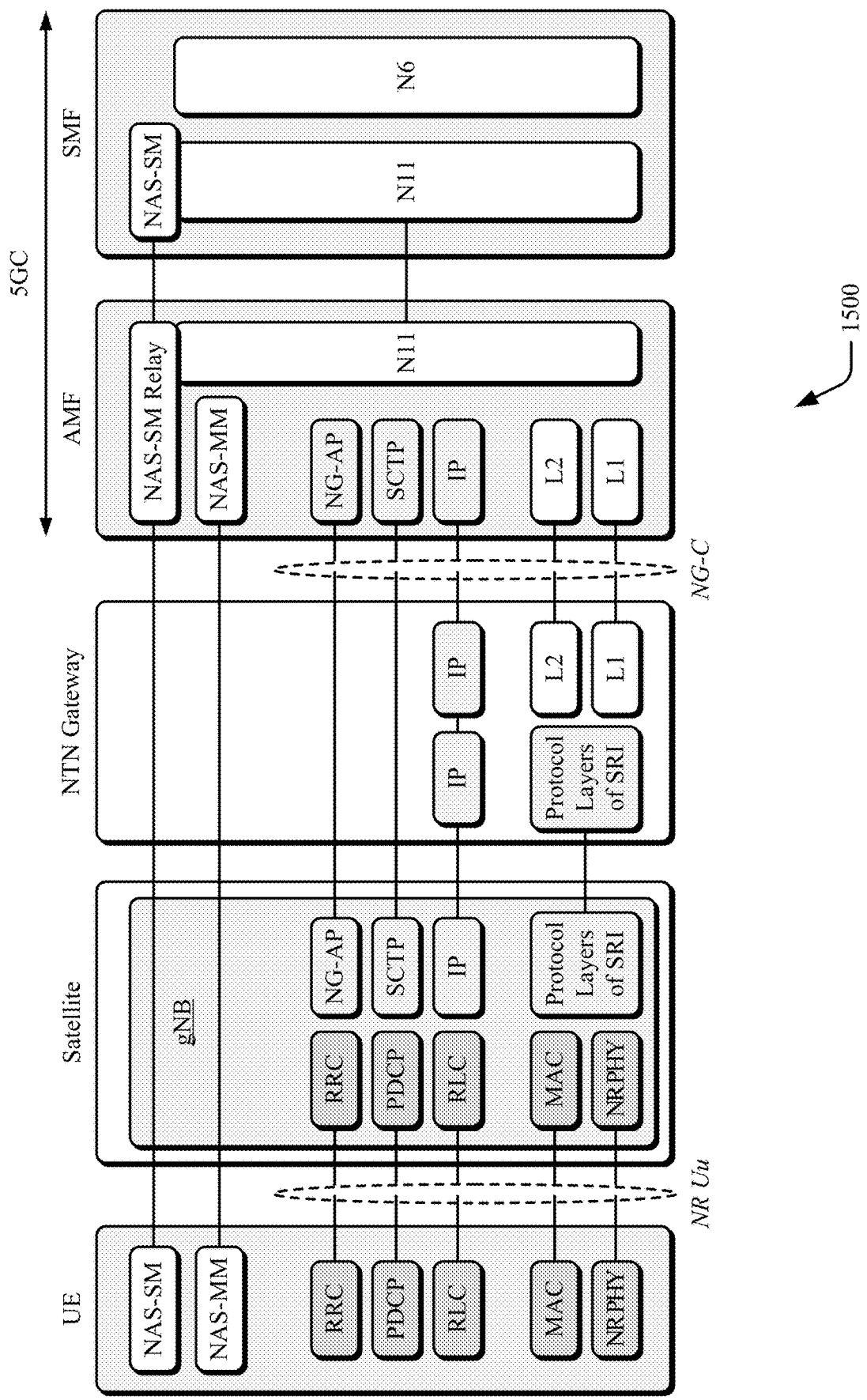
FIG. 15 illustrates an example of the UE control plane protocol stack for a PDU session, with respect to the regenerative satellite-based NG-RAN architecture with the gNB onboard, adaptable for positioning in an NTN in accordance with aspects of the present disclosure.

FIG. 13 illustrates an example 1300 of a regenerative satellite-based NG-RAN architecture with gNB onboard, and the quality of service (QOS) flows. FIG. 14 illustrates an example 1400 of the UE user plane protocol stack for a PDUsession, with respect to the regenerative satellite-based NG-RAN architecture with the gNB onboard. The protocol stack of the satellite radio interface (SRI) is used to transport the UE user plane between the satellite and the NTN gateway. The user protocol data units (PDUs) are transported over GTP-U tunnels between the 5GC and the onboard gNB, via the NTN gateway. FIG. 15 illustrates an example 1500 of the UE control plane protocol stack for a PDU session, with respect to the regenerative satellite-based NG-RAN architecture with the gNB onboard. The NG-AP is transported over SCTP, between the 5GC and the onboard gNB, via the NTN gateway. The non-access stratum (NAS) protocol is also transported by the NG-AP protocol, between the 5GC and the onboard gNB, via the NTN gateway.

Aspects of the present disclosure provides solution enhancements for performing third generation partnership project (3GPP) positioning via the NR NTN NG-RAN architectural framework. The disclosure techniques include configuring the expected RSTD window for DL-TDOA positioning in an NTN. This is applicable to a NTN TRP operating as a reference node in the network, and is also applicable to both intra-frequency as well as inter-frequency measurements. The disclosure techniques also include positioning determinations based on measuring the Doppler frequency of a signal from a LEO or MEO satellite, with respect to the target UE. The disclosure techniques also include enhancing the multi-RTT procedure to reduce signaling overhead due to the large propagation distances, as well as adapt the transmit power for SRS transmissions between a NTS in the NTN and TN TRPs. Additionally, aspects of the disclosure take into account NTN node behaviors in error cases.

The techniques described herein for positioning in an NTN may be implemented in combination with each other to support NR positioning using the supported NTN interfaces and network entities and/or nodes. These aspects of positioning in an NTN provide solutions to integrate an NTN and location service (LCS) NG-RAN architectures, which supports accurate, reliable, and (where applicable) low-latency location services. These techniques for enhancements to the configuration and reporting for the different supported RAT-dependent positioning methods may be implemented to perform positioning determinations in an NTN.

As used herein, a positioning-related reference signal may refer to a reference signal used for positioning techniques, positioning procedures, positioning methods, and/or positioning purposes to estimate a location of a target UE. A reference signal may be a PRS, or based on existing reference signals, such as a SRS. A target UE may be referred to as the UE, device, or entity to be localized and/or positioned based on a positioning determination. A UE may be referred to as a target UE or as the UE of interest, for which the positioning is to be determined or calculated by a network entity or by the UE itself.

Notably, any of the positioning techniques described in the present disclosure may be implemented in combination with any additional positioning techniques described in the related disclosures: U.S. patent application Ser. No. 17/554,583 entitled "Configuration and Reporting in a Non-Terrestrial Network" filed Dec. 17, 2021; U.S. patent application Ser. No. 17/554,689 entitled "Signal Isolation using Polarization in a Non-Terrestrial Network" filed Dec. 17, 2021; and U.S. patent application Ser. No. 17/555,164 entitled "Positioning Capability Data Exchange in a Non-Terrestrial Network" filed Dec. 17, 2021, the full disclosures of which are incorporated by reference herein in their entirety.

The described techniques include DL-TDOA positioning in an NTN, and takes into account the physical layer configuration parameters that are enhanced and adapted to accommodate the propagation delay times induced by satellite gNBs transmitting the PRS for performing RSTD measurements by a target UE, as well as the additional delay caused when positioning-related messages are communicated between the target UE and the various network entities. The LMF may configure the DL-TDOA assistance data to be received by a target UE, which is applicable to serving the NTN TRP, a gateway, and neighboring TN TRPs; and serving the TN TRP, a secondary NTN TRP, and gateway. The functionalities supported by the LMF include location determination for a UE, obtaining downlink location measurements or a location estimate from the UE, obtaining uplink location measurements from the NG-RAN, and obtaining non-UE associated assistance data from the NG-RAN.

The RSTD measurements used to compute the location of the target UE by using DL-TDOA may be adapted and updated in terms of the expected RSTD configured by the LMF. The LMF may derive a RSTD value based on a priori coarse location of the target UE, which may be obtained by a positioning method, such as enhanced cell-ID (E-CID), and then predict the expected RSTD value within a search window. This expected RSTD time resolution parameter indicates a predicted RSTD measurement between the signals from at least two TRPs, which are referred to as a reference TRP and a secondary TRP (also referred to as a neighboring or measured TRP).

It should be noted that the reference TRP may not be identical to the secondary TRP. The reference TRP may be implemented as an NTN gNB, or as a TN gNB. The expected RSTD field takes into account the propagation time difference and the transmit time difference of the PRS occasions between the two TRPs (e.g., an NTN TRP and a TN TRP). Further, the expected RSTD window and the associated RSTD uncertainty assists the UE in obtaining or determining a time instance in which to expect the PRS occasion from a neighboring or secondary TRP.

Figure 16:
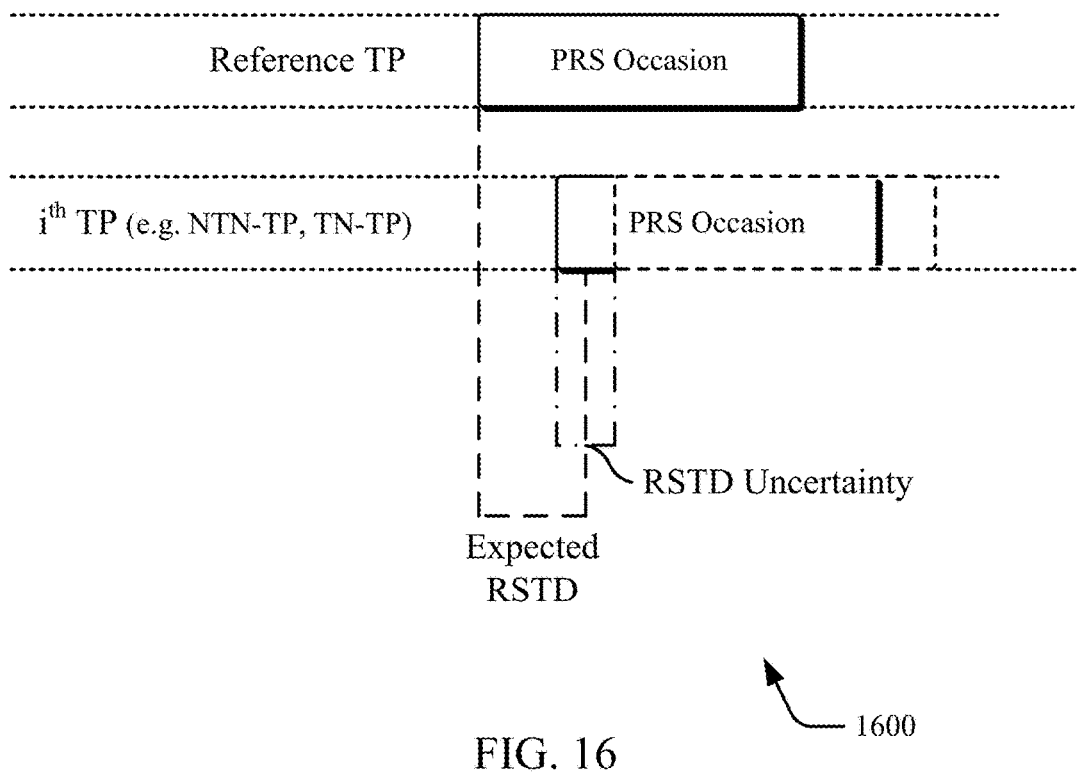
FIG. 16 illustrates an example of an NTN expected RSTD window and uncertainty on a same frequency layer, as related to positioning in an NTN in accordance with aspects of the present disclosure.

FIG. 16 illustrates an example 1600 of an NTN expected RSTD window and uncertainty on a same frequency layer, as related to positioning in an NTN in accordance with aspects of the present disclosure. The example 1600 illustrates the concept of an adapted RSTD search window for performing NTN-based DL-TDOA on the same positioning frequency layer. Initially, the target UE obtains a timing from the reference TP, and then the target UE computes an expected RSTD window, as described below. The target UE obtains a PRS occasion for a secondary TRP (e.g., the i-th TP), based on the timing obtained from the reference TP and the computed expected RSTD.

Figure 17:
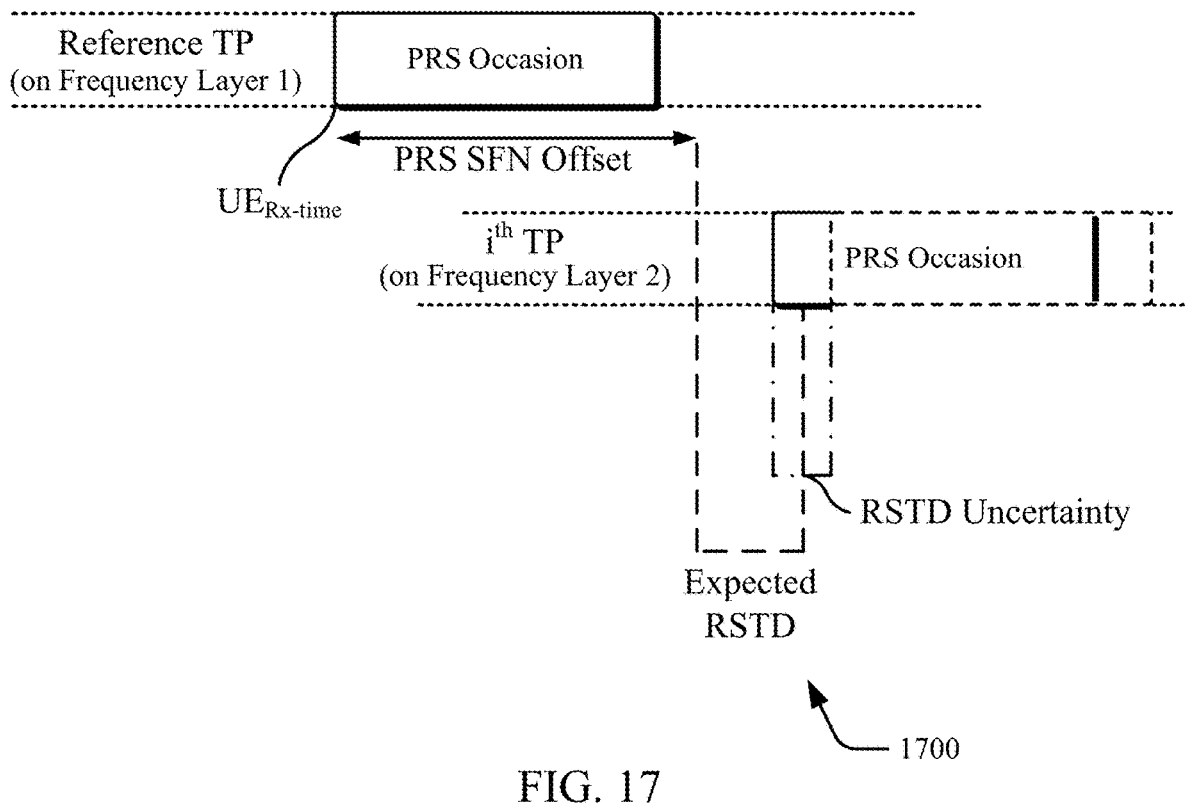
FIG. 17 illustrates an example of an NTN expected RSTD window and uncertainty on a different frequency layer, as related to positioning in an NTN in accordance with aspects of the present disclosure.

FIG. 17 illustrates an example 1700 of an NTN expected RSTD window and uncertainty on a different frequency layer, as related to positioning in an NTN in accordance with aspects of the present disclosure. The example 1700 illustrates the concept of an adapted RSTD search window for performing NTN-based DL-TDOA on a different positioning frequency layer. Initially, the target UE obtains a timing from the reference TP, and then the target UE computes an expected RSTD, as further described below. The target UE obtains a PRS occasion for a secondary TRP, (e.g., the i-th TP), based on the timing obtained from the reference TP and the computed expected RSTD.

Figure 18:
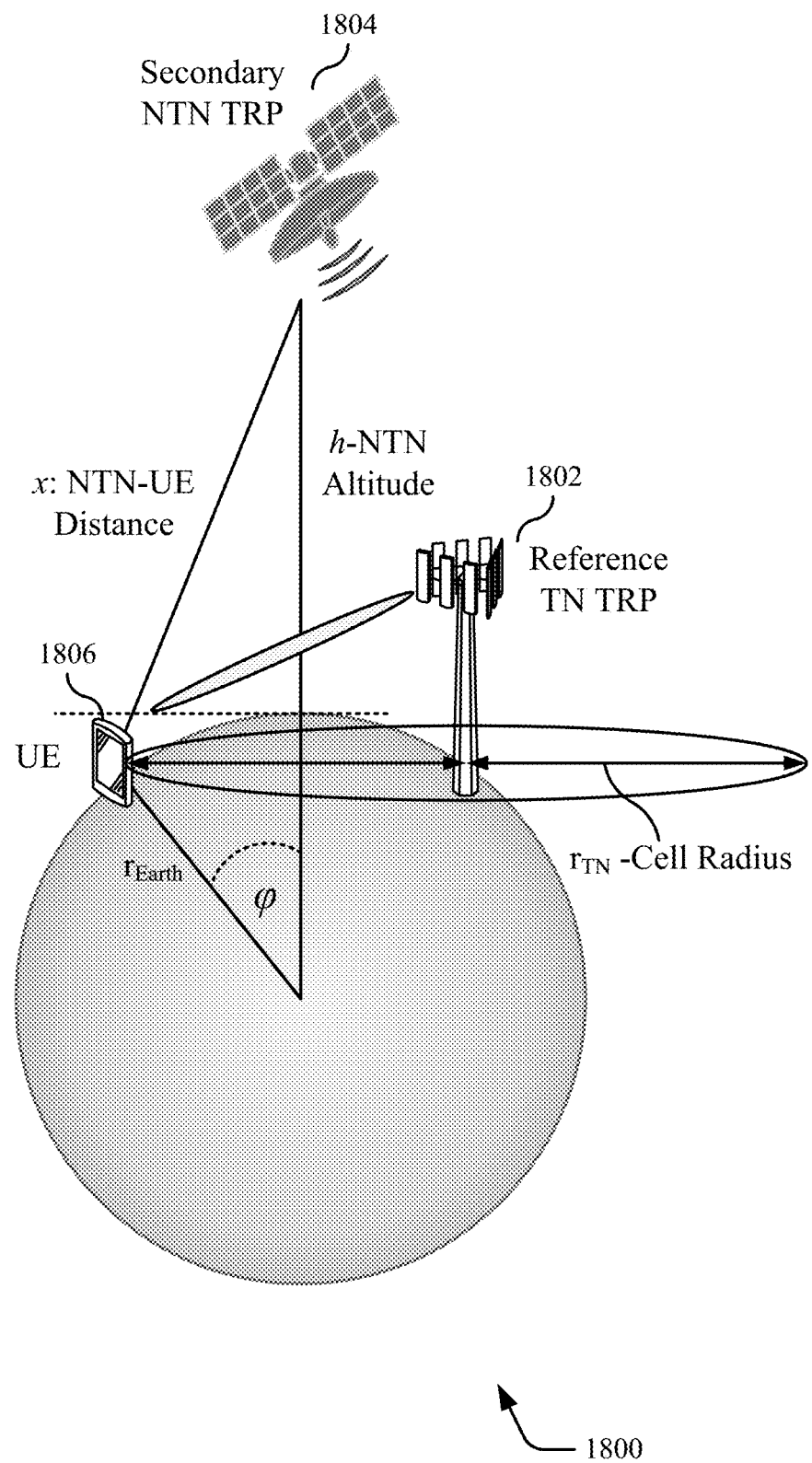
FIG. 18 illustrates an example of RSTD between a reference TN TRP and an NTN TRP, as related to positioning in an NTN in accordance with aspects of the present disclosure.

FIG. 18 illustrates an example 1800 of RSTD between a reference TN TRP 1802 and an NTN TRP 1804, as related to positioning in an NTN in accordance with aspects of the present disclosure. This example 1800 illustrates the concept of adapting the search window assuming a reference TN TRP 1802, where the reference signal transmitted at time t arrives at the target UE 1806 at t+$T_{NTN-Prop-Delay}$.

Similarly, in the case of the NTN TRP 1804, a reference signal transmitted at time t+Δ, where Δ=Transmit time offsets between the TN TRP 1802 and the NTN TRP 1804 (Δ=0 for an ideal perfect synchronization case) arrives at the target UE 1806 at (t+Δ)+$T_{NTN-Prop-Delay}$, where the signal propagation delay times ($T_{TN-Prop-Delay}$ and $T_{NTN-Prop-Delay}$) as a function of distance are given as Eq1 and Eq2:

$$T_{TN-Prop-Delay} = \frac{r}{c}, \tag{Eq1}$$

$$T_{NTN-Prop-Delay} = \frac{x-h}{c}, \tag{Eq2}$$

where x=$\sqrt{r_{Earth}^2+(r_{Earth}+h)^2-2r_{Earth}h\cos\varphi}$, c is the speed of light, $r_{TN}$ is the maximum cell radius of the TN TRP 1802, and his altitude of the NTN TRP 1804. The expected RSTD is the time difference of the arrival times from the reference TRP 1802 and neighboring or secondary TRPs (e.g., the NTN TRP 1804). The expected RSTD is given as Eq3, Eq4, Eq5, and Eq6:

$$\text{Expected } RSTD = T_{Ref-TN-Arrival} - T_{NTN-Arrival}, \tag{Eq3}$$

$$= (t + T_{TN-Prop-Delay}) - ((t + \Delta) + T_{NTN-Prop-Delay}), \tag{Eq4}$$

$$= \left(t + \frac{r}{c}\right) - \left((t+\Delta) + \frac{x-h}{c}\right), \tag{Eq5}$$

$$= \frac{r}{c} - \Delta - \frac{x-h}{c}, \tag{Eq6}$$

The expected RSTD search window resolution for two implementations is given as function of the sampling time, as described below for a same positioning frequency layer and a different positioning frequency layer. In the instance of a same positioning frequency layer, the expected RSTD search window may be set to:

Expected RSTD Window=[−Expected RSTD×$T_s$×R; Expected RSTD×$T_s$×R]

where sampling time equals $T_s=1/(\Delta f_{max} \times N_{FFT})$. For example, $T_s=1/(15\ kHz \times 2048)$ for a NR NTN.

In the instance of a different positioning frequency layer, the expected RSTD search window may be set to:

Expected RSTD Window=[−Expected RSTD×$T_s$×R; Expected RSTD×$T_s$×R]

centered at ($UE_{Rx-Time}$+(1 ms×$N_{PRS-Offset}$)+Expected RSTD×$T_s$×R), where the sampling time equals $T_s=1/(\Delta f_{max} \times N_{FFT})$.

For example, $T_s=1/(15000 \times 2048)$ for a NR NTN with $\Delta f_{max}=15$ kHz and $N_{FFT}=2048$ as the subcarrier spacing and FFT size, respectively. In some implementations, the subcarrier spacing may be associated with FR1 frequencies, such as 30 kHz and 60 kHz, while in other implementations, the subcarrier spacing may be associated with FR2 frequencies, such as 120 kHz and 240 kHz. The parameter $N_{PRS-Offset}$ may be configured and signaled by the LMF. Resolution R may be fixed in the specification, configured and/or signaled by the network, determined by a UE implementation, or a combination thereof.

Figure 19:
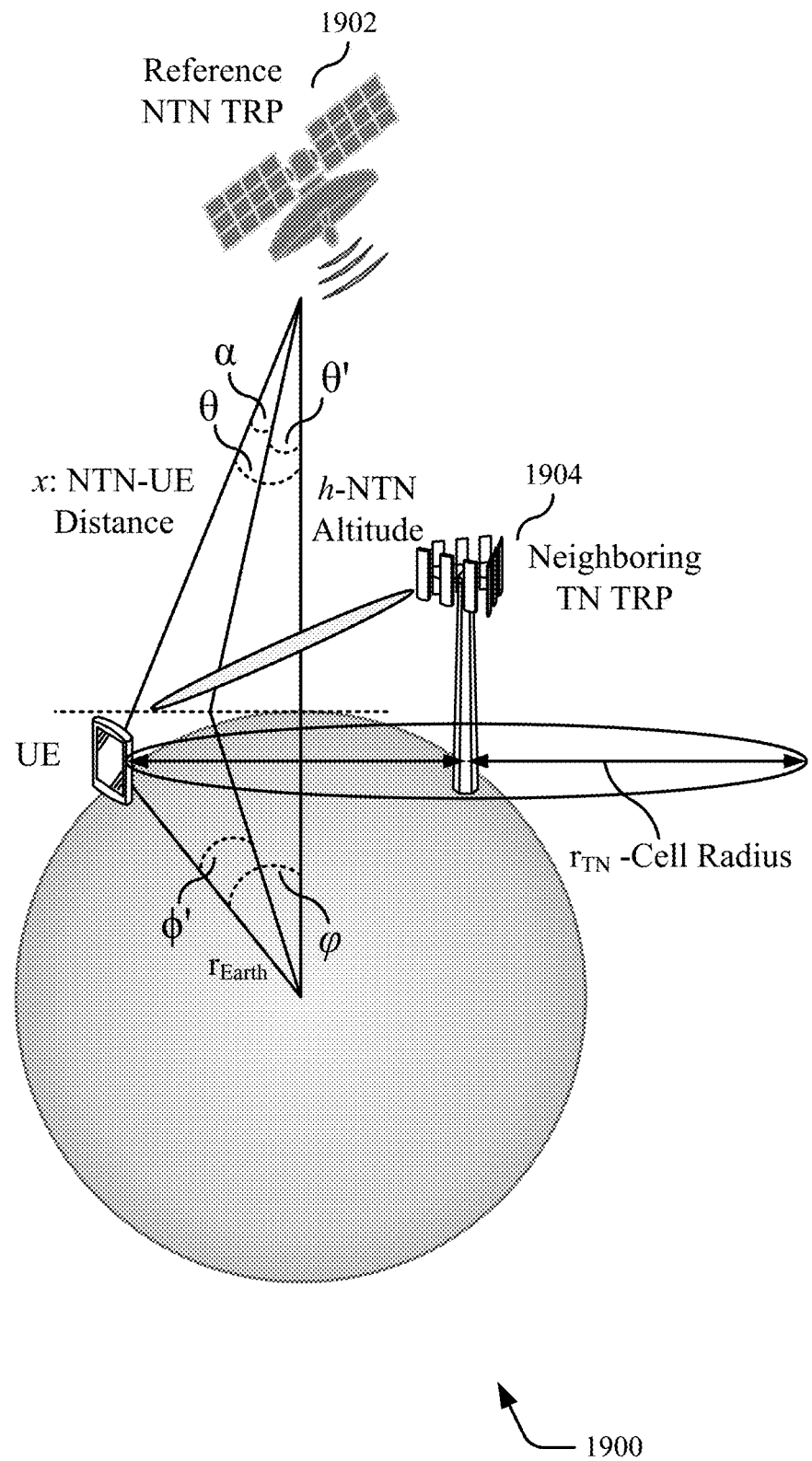
FIG. 19 illustrates an example of RSTD between a reference NTN TRP and a neighboring TN TRP, as related to positioning in an NTN in accordance with aspects of the present disclosure.

FIG. 19 illustrates an example 1900 of RSTD between a reference NTN TRP 1902 and a neighboring TN TRP 1904 as related to positioning in an NTN in accordance with aspects of the present disclosure. In this example 1900, the NTN TRP 1902 is a reference node and the expected RSTD may be calculated according to Eq3 above as a function of maximum propagation delay difference within an NTN beam opening angle of a and coverage angle of θ.

The maximum propagation delay difference of the NTN TRP 1902, assuming antenna coverage area furthest from the satellite, is given as Eq7:

$$T_{NTN\text{-}Prop\text{-}Delay} = \frac{x - x'}{c} \quad (Eq7)$$

where $x' = \sqrt{r_{Earth}^2 + (r_{Earth}+h)^2 - 2r_{Earth}h\cos\varphi'}$, c is the speed of light, $r_{TN}$ is the maximum cell radius of the TN (gNB) TRP 1904, and h is the altitude of the NTN TRP 1902. Additionally, $\theta'=\theta-\alpha$.

The expected RSTD is the time difference of the arrival times from the reference NTN TRP 1902 and neighboring or secondary TN TRP 1904. The expected RSTD is given as Eq8, Eq9, Eq10, and Eq11:

$$\text{Expected } RSTD = T_{Ref\text{-}NTN\text{-}Arrival} - T_{TN\text{-}Arrival}, \quad (Eq8)$$

$$= (t + T_{NTN\text{-}Prop\text{-}Delay})) - ((t + \Delta) + T_{TN\text{-}Prop\text{-}Delay}), \quad (Eq9)$$

$$= \left(t + \frac{x-x'}{c}\right) - \left((t+\Delta) + \frac{r}{c}\right), \quad (Eq10)$$

$$= \frac{x-x'}{c} - \left(\Delta + \frac{r}{c}\right), \quad (Eq11)$$

In an implementation, a UE is configured with at least two PRS occasions, where the first PRS occasion is associated with a PRS from NTN TRP and the second PRS occasion is associated with a PRS from TN TRP. In another implementation, a UE is configured with at least N+1 PRS occasions, where the first PRS occasion is associated with a reference TRP and the other (N+1) PRS occasions are associated with respective other (N+1) TRPs. Each of the other (N+1) TRPs may be a TN TRP or an NTN TRP. Each of the N PRS occasions may be indicated by the network with an offset to the reference PRS occasion. Alternatively, some or all of the N PRS occasions may be indicated independently from the reference PRS occasion.

In the case of mixed orthogonal frequency division multiplexing (OFDM) numerology, the offset to the reference PRS occasion may be indicated in a number of symbols by an assumption that a symbol duration is described in a reference numerology. The reference numerology may be the numerology of the PRS. In any of the implementations described herein, the reference TRP used for determining the PRS occasion timing may or may not be identical to a TRP whose signal is used as a reference for positioning. In that sense, the term reference TRP may refer to either or both of the meanings. In another implementation, a UE may be configured with N+M PRS occasions, where each of the M PRS occasions are associated with M reference TRPs, and N other PRS occasions are associated with N other TRPs. Each of the N TRPs may be a TN TRP or an NTN TRP.

In an application, the NTN TRPs may be connected to multiple gateways and/or to multiple central units (CUs). In this case, each of the M reference TRPs may be connected to a different gateway and/or CU. If a reference NTN TRP is connected to a gateway and/or CU, then a PRS occasion associated with any other NTN TRP connected to the same gateway and/or CU may be indicated with an offset to the reference PRS occasion associated with the reference NTN TRP. In another application, the movement of NTN TRPs may cause a large relative drift of PRS occasions due to different movement trajectories. In this case, an NTN TRP may be configured as a reference NTN TRP for a group of other NTN TRPs that cause a relatively similar drift of PRS occasions.

In aspects of positioning in an NTN, Doppler-assisted positioning is considered, such as based on Doppler measurements at a target UE. In implementations, the UE in range of multiple satellite gNBs performs measurements on positioning reference signals (PRSs) from the multiple satellites. The UE may then compute the location or refine its positioning information based on combining the results of the measurements with other information, such as ephemeris information of the satellite gNBs transmitting the positioning reference signals (PRSs), which may be obtained through a system information block (SIB), time stamp parameters, and location information obtained by non-terrestrial (NT) gNBs. In an implementation, a target UE receives an indication that a PRS is not Doppler-pre-compensated. The UE may perform a measurement on the PRS and obtain a value of Doppler frequency shift. The UE then combines the information with the ephemeris information it receives in a system information block (SIB) from the satellite gNB (or from the NT-TRP) in order to obtain a relative position with respect to the moving satellite.

The UE itself may perform the above procedure on positioning reference signals (PRSs) from multiple satellite gNBs and combine the results in order to update its position or refine a position obtained through other means. For example, the UE may obtain location information by receiving positioning reference signals (PRSs) from TN gNBs. In rural areas where the number of TN gNBs in range may not be sufficient (e.g., less than three) or the signal-to-noise ratio (SNR) is lower than a threshold, the UE may use the Doppler measurement on designated positioning reference signals (PRSs) in order to compute or refine positioning information.

In implementations, the Doppler measurement obtained from the measurement on a PRS may be combined with the beam and/or spatial information associated with the PRS. The beam and/or spatial information may be a quasi co-location (QCL) type D relationship between the PRS and another downlink reference signal, such as a channel-state information reference signal (CSI-RS) or synchronization signal block (SSB). Alternatively, the spatial information may comprise an angle of incidence with respect to the ground, and additionally, beam-width information, such as a 3 dB angle half power beam width (HPBW) in order to compute the accuracy of the method.

Figure 20:
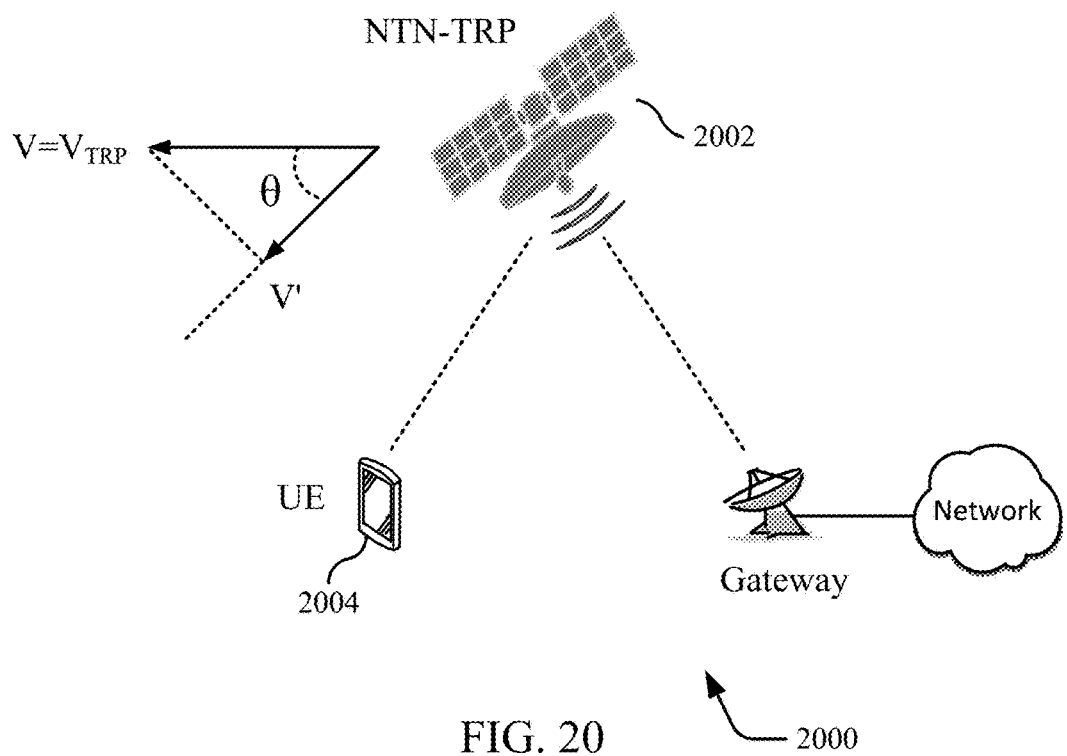
FIG. 20 illustrates an example of an NTN TRP traveling at a velocity, as related to positioning in an NTN in accordance with aspects of the present disclosure.

FIG. 20 illustrates an example 2000 of an NTN TRP 2002 traveling at a velocity $V_{TRP}$, as related to positioning in an NTN in accordance with aspects of the present disclosure. This example 2000 illustrates an example NTN scenario for positioning based on Doppler frequency measurements. The NT-TRP 2002 travels at a velocity $V=V_{TRP}$ in a direction that has an angle θ with the line connecting the NTN TRP 2002 and a target UE 2004. Therefore, the projection of the velocity vector on the line is V'=V cos θ, which is the velocity component that causes a Doppler shift as perceived by the UE 2004, as given in Eq12:

$$f_D = \frac{f_c}{c} V' \quad \text{(Eq12)}$$

Therefore, if $f_c$ is known to the UE, by measuring the Doppler shift $f_D$, the UE may obtain V'. Furthermore, the UE may obtain ephemeris information of the NTN TRP, which may include movement trajectory information of the NTN TRP. Given this information, the UE may obtain the velocity V and the location of the NTN TRP at any moment, and the UE may calculate the value of θ, as given in Eq13:

$$\theta = \cos^{-1} \frac{V'}{V} \quad \text{(Eq13)}$$

From this point, there are different options for computing the position. In an implementation, the UE may obtain a time of arrival by measuring a PRS from the NTN TRP. Then, the UE may calculate the distance between the UE and the NTN TRP, which together with the value of θ and the location of the NTN TRP (obtained from the broadcast ephemeris) may be used to obtain an estimate of the position of the UE. In an alternate implementation, the value of θ is combined with other information, such as RSRP, or time of arrival (ToA) or angle of arrival (AoA), to compute or refine an estimate of the position of the UE. In some aspects, multiple values of the angle θ associated with multiple NTN TRPs may be used to compute a position. Although a minimum of two TRPs are used for this procedure, a larger number of TRPs may be used to improve the accuracy of the procedure.

The reference signals for Doppler frequency measurements may be any signal, such as a reference signal that may or may not be used specifically for positioning (e.g., PRS and channel-state information reference signal (CSI-RS), respectively). Given the need to obtain an accurate Doppler-shifted frequency of the reference signal, a synchronization signal and physical broadcast channel (SS/PBCH) block may be an appropriate option for the reference signal for Doppler measurements. A NT-TRP may apply a Doppler pre-compensation to downlink signals in order to make signal detection and data decoding easier for the receiver(s) on the ground. Doppler pre-compensation in this context may include applying a shift to the frequency of the downlink signals, so as to compensate for the effect of Doppler on the downlink signals with respect to a receiver on the ground, thus allowing the receiver to detect the signal close to the target frequency. While Doppler pre-compensation may be applied in some realizations, it affects the Doppler measurements by the UE.

Accordingly, to address the Doppler measurements by the UE, a target UE receives an indication that reference signals, such as a PRS, channel-state information reference signal (CSI-RS), or synchronization signal and physical broadcast channel (SS/PBCH) block is not Doppler pre-compensated. The target UE may then perform a measurement on the reference signal to obtain a Doppler frequency associated with the reference signal. The target user interface (UE) also uses the actual frequency of the reference signal as observed by the moving NT-TRP. This frequency information may be communicated to the UE through a configuration, by UE-specific or UE-group-specific control signaling, as a broadcast or geo-cast signal, such as a system information block (SIB), or as a combination thereof. Alternatively, a list of center frequencies of the reference signal may be limited by configuration or specification such that the UE may map the Doppler-shifted frequency to the nearest possible center frequency from the list.

In another implementation to address the Doppler measurements by the UE, the target UE may perform a measurement on a Doppler pre-compensated reference signal. In addition, the UE may receive information of the Doppler pre-compensation value. The UE may then add or subtract the Doppler pre-compensation value in order to obtain the Doppler frequency. The UE may receive the information by a configuration, as control signaling, as broadcast or geo-cast signaling, or as a combination thereof.

In aspects of positioning in an NTN, multi-NTN (non-terrestrial network) RTT positioning enhancements are taken into consideration, which support RTT positioning from multiple NTN TPs and/or from TN TPs. The RTT positioning enables calculation of the relative distance between a connected NTN TRP and target UE. A higher number of simultaneous in-coverage, NTN satellites may improve the range accuracy for a target UE, although the RTT procedure should be completed before the NTN satellites are out of coverage.

Figure 21:
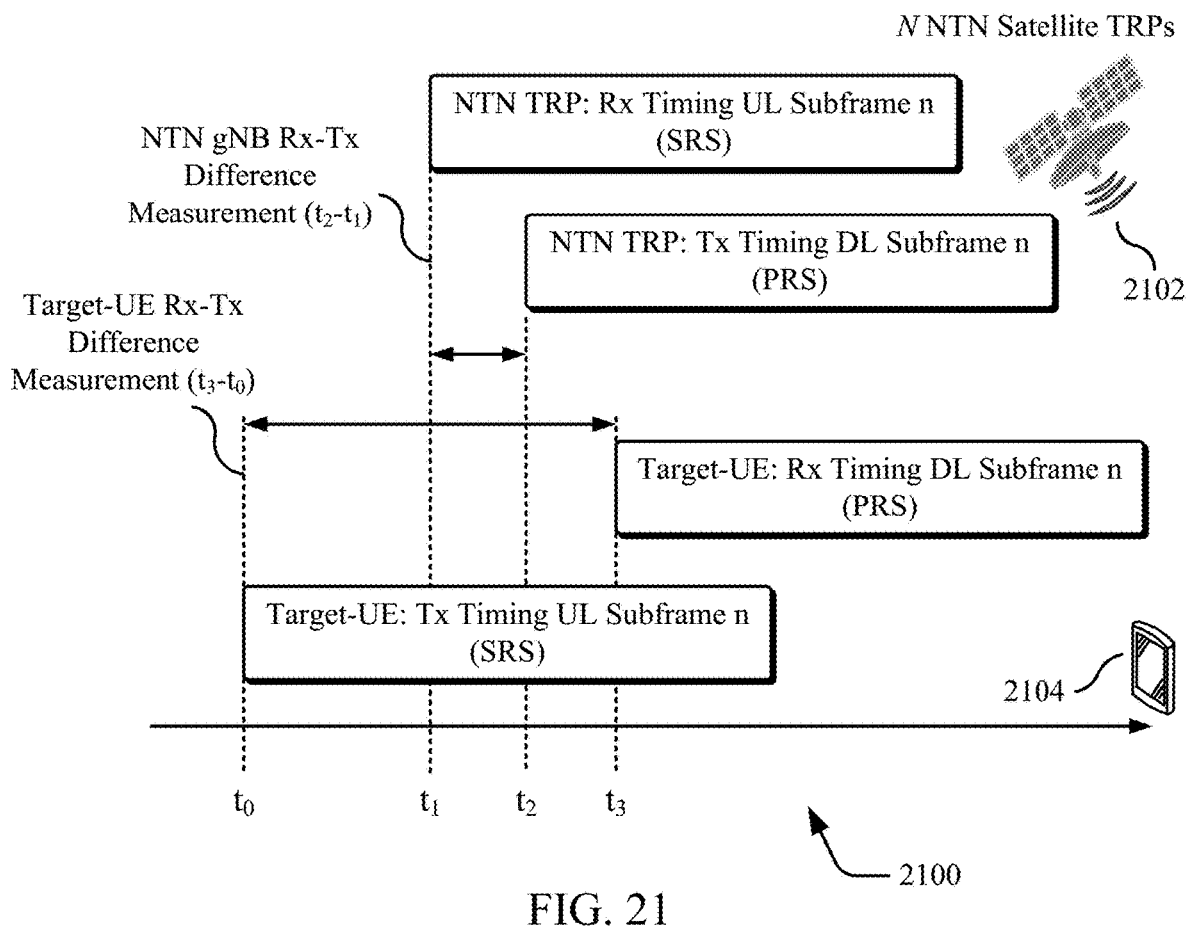
FIG. 21 illustrates an example of NTN-based multi-RTT positioning as related to positioning in an NTN, as related to positioning in an NTN in accordance with aspects of the present disclosure.

FIG. 21 illustrates an example 2100 of NTN-based multi-RTT positioning as related to positioning in an NTN in accordance with aspects of the present disclosure. This example 2100 illustrates that the relative range is calculated based on distance between the NTN TRP 2102 and a target UE 2104, as given in Eq14:

$$d_{NTN-UE} = c \cdot \frac{RTT}{2} \quad \text{(Eq14)}$$

where c is the speed of light, and RTT is the round-trip time. The Doppler and propagation time delays may affect the aforementioned distance calculation, and therefore may also be compensated as part of the NTN-based multi-RTT procedure.

The number of signaling exchanges, as shown in FIG. 2, may become a bottleneck in an NTN. The radio resource control (RRC) signaling separately configures the SRS type of transmission (e.g., periodic, semi-persistent, aperiodic), while activation of the medium access control (MAC) control element (CE) (MAC-CE) enables the transmission of SRS for measurement by the NTN TP. In an implementation, activation of the SRS is autonomous, whereby the SRS configuration designates a defined activation time in order to reduce signaling overhead.

Given that the propagation delay between the NTN TP and multiple target UEs may have a large difference compared to terrestrial systems, each UE may be configured or signaled to transmit the SRS with a delay. The delay value may be UE specific or UE-group-specific, thereby allowing the NTN TP to receive the SRS from the target UE in designated time intervals.

In an implementation, the delay value may be configured by the network, for example, with parameters of a positioning configuration. However, since the propagation delay is variable as the NTN TP moves, the delay value may be updated by later configuration messages, or may be associated with an expiration time. The UE may then apply the delay value before the value is expired. A positioning configuration may include the delay value, as well as a drift rate associated with the delay value. The UE may then apply the delay value drift rate in order to update the delay value over time. In another implementation, the delay value may be signaled by the gNB, which may be integrated with the NTN TP in an NTN architecture based on a regenerative payload.

Alternatively, the gNB may be a ground gNB communicatively connected to the gateway in an NTN architecture based on a transparent payload. The delay value in this case may be included in L1/L2 control signaling, such as in the medium access control element (MAC CE) message used for activating the SRS. The target UE may be implemented to dynamically switch and/or control the SRS transmit power based on whether the RTT is performed with respect to a TN TRP or an NTN TRP. For an NTN TRP, the UE is implemented to utilize an open loop or closed loop power control mechanism for the transmission of a SRS for positioning, or a multiple-input multiple-output (MIMO) SRS.

In aspects of the described techniques for positioning in an NTN, a combination of the positioning procedures (techniques, methods) may be utilized. In an implementation, the LMF may configure or signal to an entity (e.g., a network entity or a UE) to obtain a distance estimate of the distance between a TRP and a UE by performing a positioning method, such as a Doppler-based method or a NTN-based multi-RTT method. The estimate of the distance may then be used to configure a DL-TDOA method, as described above, with the parameter x set to the estimate of the distance in order to configure the expected RSTD window.

In another implementation, the LMF may configure or signal to an entity (e.g., a network entity or a UE) to obtain an angle estimate of the line connecting a TRP and a UE by performing a positioning method, such as a Doppler-based method or a NTN-based multi-RTT method. Combined with an altitude of the UE, the entity or the LMF may then obtain an estimate of the distance between the TRP and the UE, which may then be used for configuring a DL-TDOA, as discussed above, with the parameter x set to the estimate of the distance in order to configure the expected RSTD window.

In another implementation, an angle of the line between a TRP and a UE may be obtained by a Doppler-based method, while a distance between the TRP and the UE may be obtained by a multi-RTT method. The information of the angle and the distance may then be combined, and an approximate position of the UE obtained, which may then be used by the LMF, or another configuration entity, for a positioning configuration.

In aspects of positioning in an NTN, as described and related to the positioning methods (procedures, techniques), it is noted that the LMF may configure error causes associated with the provisioning of assistance data for a positioning process (e.g., a process based on DL-TDOA, Doppler-assisted positioning, NTN-based multi-RTT), which may include gateway assistance data not available, NTN TRP assistance data not available, assistance data not supported by the LMF, and/or assistance data supported, but not available. Similarly, the target UE may report error causes, which may include gateway assistance data missing, NTN TRP assistance data missing, unable to perform a measurement on an NTN TRP, unable to perform a measurement on a secondary NTN TRP, a link failure with an NTN TRP, and/or an NTN TRP out-of-coverage.

In some implementations, the LMF may configure a behavior associated with an error related to assistance data not supported or not available, failing measurements, network nodes out of coverage, and the like. In an embodiment, if an assistance data message is missing, unavailable, outdated, obsolete, or not supported by a communication entity (such as network entity or a user entity), a configured entity may instead use data from a standard specification, a pre-configuration, a default or fallback (pre-) configuration, a configuration from an alternative network entity, a signaling with another network entity, or any type of combination thereof. The configured entity may be a network entity such as a base station, a NTS, a network gateway, and so on. Alternatively, the configured entity may be a user entity, such as a UE.

In other implementations, if an assistance data message is missing, unavailable, outdated, obsolete, or not supported by a communication entity (such as network entity or a user entity), a configured entity may report an associated error. Alternatively or in addition, the configured entity may obtain data to use instead, such as via a request-response signaling with the configuration entity, such as the LMF, a CU, etc. The configured entity may be a network entity such as a base station, a NTS, a network gateway, and so on. Alternatively, the configured entity may be a user entity, such as a UE. In another implementation, a communication entity, such as a UE may not be able to perform a measurement on a signal, and may report an error as configured by a configuration entity, such as the LMF. Alternatively, the communication entity may use an alternative signal for a measurement according to a specification, a (pre-) configuration, a lower-layer signaling, or a combination thereof.

In some examples, a UE may report an out-of-coverage error for an NTN TRP if a number of available NTN TRPs for an associated positioning process is smaller than a threshold. Alternatively, the UE may report an out-of-coverage error for an NTN TRP if a total number of available NTN TRPs and TN (ground) TRPs for an associated positioning process is smaller than a threshold.

In some examples, upon detecting that an NTN TRP is out-of-coverage, a UE may request a configuration entity, such as the LMF or CU to configure another TRP for the positioning process. A UE may be configured to perform measurements on a signal from a first TRP, such as an NTN or TN, when a signal from a second TRP (e.g., an NTN or TN) is not available. In the described implementations and examples, the LMF may configure the positioning process and configure a behavior for handling an error. Alternatively, another configuration entity, such as a CU may configure the positioning process and/or a behavior for an error. As an alternative, a behavior may be determined by a standard specification, a pre-configuration, a signaling such as a physical layer or medium access control (MAC) control element (CE) signaling, an implementation, or a combination thereof.

Aspects of positioning in an NTN are described with reference to various implementations of an NTN architecture. Further, various implementations are based on measurements of reference signals originating from the non-terrestrial transmit-receive point (NT-TRP) (e.g., a satellite or other NTS). However, it should be noted that a reference signal may also originate elsewhere in the NTN (e.g., not at the NT-TRP). The network node that generates the downlink signals, including the downlink reference signals used for positioning determinations, may or may not be the non-terrestrial transmit-receive point (NT-TRP), depending on the architecture of the NTN.

In aspects of the disclosure, an NTN architecture may be implemented as a RPA. For example, a full gNB or a DU of the base station may be implemented onboard a satellite, from which the downlink signals are generated. The information that may be obtained based on the service link between the non-terrestrial transmit-receive point (NT-TRP) and the UE includes: the propagation delay of the service link, which may affect the timing of the resources used for transmitting and/or receiving reference signals, performing measurements, and so on; the pathloss of the service link, which affects a signal quality of strength such as the RSRP; and the Doppler frequency shift associated with the service link, which may be used for adjusting timing and/or used directly for obtaining or refining an estimate of the position of the UE.

Alternatively, an NTN architecture may be implemented as a TPA. For example, a full gNB or a DU of the base station may be communicatively connected to the gateway. Accordingly, the downlink signals are generated before the signals are transmitted to the non-terrestrial transmit-receive point (NT-TRP) and then relayed to the UE. In this case, the information that may be obtained based on the feeder link between the gateway and/or gNB, and the non-terrestrial transmit-receive point (NT-TRP), in addition to the service link between the non-terrestrial transmit-receive point (NT-TRP) and the UE, includes: propagation delay(s) of the feeder link and/or the service link, which may affect the timing of the resources used for transmitting and/or receiving reference signals, performing measurements, and so on; the pathloss of the feeder link and/or the service link, which affects a signal quality of strength such as an RSRP; and the Doppler frequency shift associated with the feeder link, the service link, or a combination of the feeder link and the service link, which may be used for adjusting timing and/or used directly for obtaining or refining an estimate of the position of the UE.

Further, the NTN architecture may be based on a combination of a RPA and a TPA. In implementations, the non-terrestrial transmit-receive point (NT-TRP) communicatively connected to the gateway may not be directly connected to the UE, but rather may be connected over multiple hops through inter-satellite links (ISLs). Any or all of the information discussed above may be obtained via, and/or be associated with, the inter-satellite links (ISLs).

The various positioning methods (techniques, procedures) for positioning may be implemented in combination with each other to support NR positioning using the supported NTN interfaces, network entities, and network nodes. A positioning-related reference signal may be referred to as a reference signal, which includes positioning information, and may be used for positioning procedures, positioning determinations, or other positioning purposes, such as to estimate the location of a target UE. A reference signal may be a PRS, or based on existing reference signals, such as a channel-state information reference signal (CSI-RS) or a SRS. In the various implementations, the term PRS refers to any reference signal that may or may not be used for positioning determinations. A target UE may be referred to as the device or network entity to be localized and/or position determined. A target UE may also be referred to as a UE of interest, and the position of the device is to be obtained by the network or by the UE itself.

The terms transmit point (TP), receive point (RP), transmit-receive point (TRP), gNB, and base station may be used interchangeably throughout the disclosure, and may refer to a network entity or network node. Any or all these terms may refer to a network entity transmitting or receiving a signal, such as a reference signal, used for positioning, also referred to as positioning determinations, methods, and/or techniques. Depending on the NTN architecture, the positioning configurations, and other factors, the network node and/or entity may generate or relay a reference signal, perform a positioning computation, and/or communicate the positioning-related information to another network entity or network node.

Figure 22:
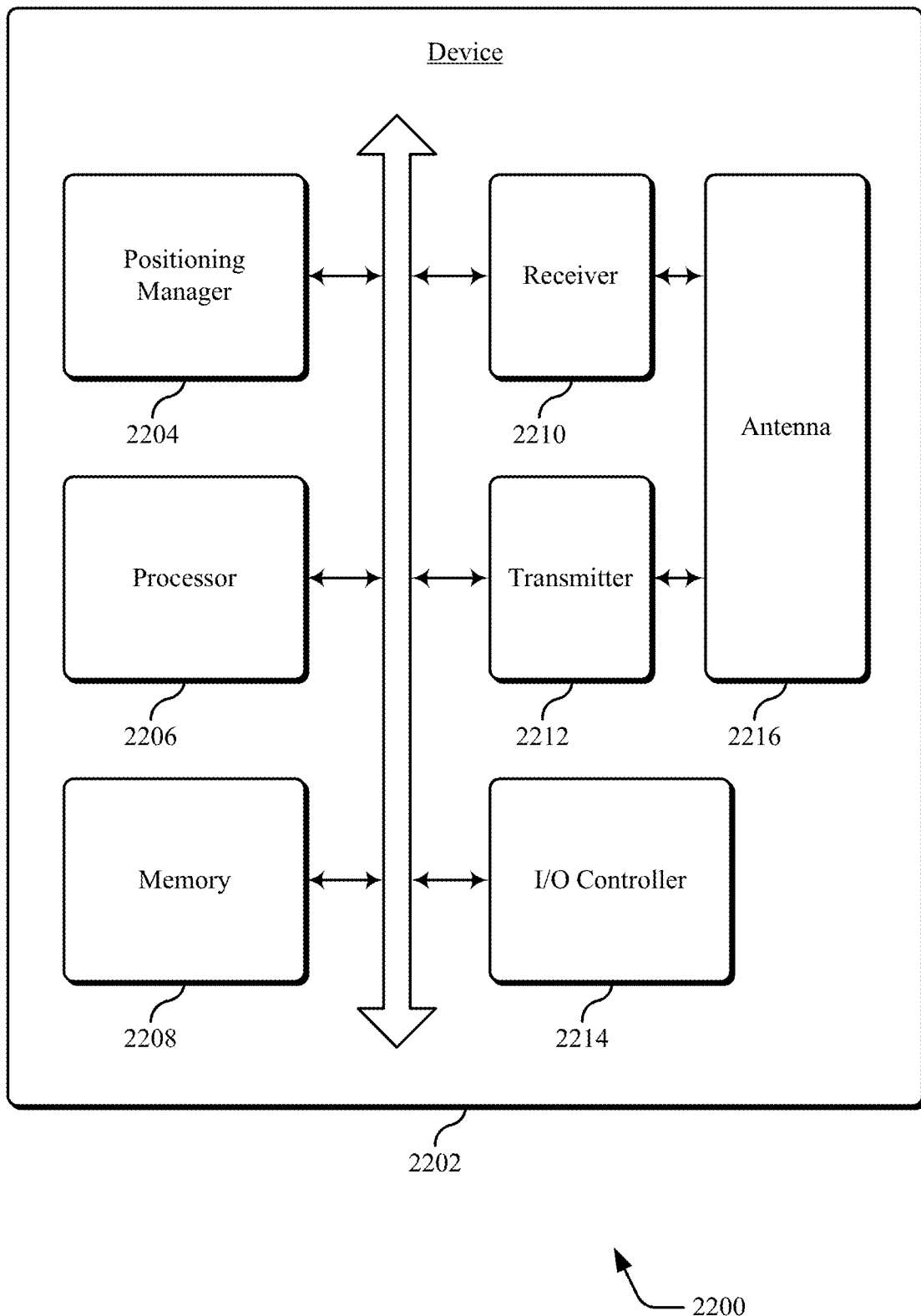
FIG. 22 illustrates an example block diagram of components of a device that supports positioning in an NTN in accordance with aspects of the present disclosure.

FIG. 22 illustrates an example of a block diagram 2200 of a device 2202 that supports positioning in an NTN in accordance with aspects of the present disclosure. The device 2202 may be an example of a UE 104 as described herein. The device 2202 may support wireless communication, positioning, and/or network signaling with one or more base stations 102, UE 104, or any combination thereof. The device 2202 may include components for bi-directional communications including components for transmitting and receiving communications, such as a positioning manager 2204, a processor 2206, a memory 2208, a receiver 2210, a transmitter 2212, and an I/O controller 2214. These components may be in electronic communication or otherwise coupled (e.g., operatively, communicatively, functionally, electronically, electrically) via one or more interfaces (e.g., buses).

The positioning manager 2204, the receiver 2210, the transmitter 2212, or various combinations thereof or various components thereof may be examples of means for performing various aspects of the present disclosure as described herein. For example, the positioning manager 2204, the receiver 2210, the transmitter 2212, or various combinations or components thereof may support a method for performing one or more of the functions described herein.

In some implementations, the positioning manager 2204, the receiver 2210, the transmitter 2212, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some implementations, the processor 2206 and the memory 2208 coupled with the processor 2206 may be configured to perform one or more of the functions described herein (e.g., by executing, by the processor 2206, instructions stored in the memory 2208).

Additionally or alternatively, in some implementations, the positioning manager 2204, the receiver 2210, the transmitter 2212, or various combinations or components thereof may be implemented in code (e.g., as communications management software or firmware) executed by the processor 2206. If implemented in code executed by the processor 2206, the functions of the positioning manager 2204, the receiver 2210, the transmitter 2212, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some implementations, the positioning manager 2204 may be configured to perform various operations (e.g., receiving, monitoring, transmitting) using or otherwise in cooperation with the receiver 2210, the transmitter 2212, or both. For example, the positioning manager 2204 may receive information from the receiver 2210, send information to the transmitter 2212, or be integrated in combination with the receiver 2210, the transmitter 2212, or both to receive information, transmit information, or perform various other operations as described herein. Although the positioning manager 2204 is illustrated as a separate component, in some implementations, one or more functions described with reference to the positioning manager 2204 may be supported by or performed by the processor 2206, the memory 2208, or any combination thereof. For example, the memory 2208 may store code, which may include instructions executable by the processor 2206 to cause the device 2202 to perform various aspects of the present disclosure as described herein, or the processor 2206 and the memory 2208 may be otherwise configured to perform or support such operations.

For example, the positioning manager 2204 may support wireless communication at a device (e.g., the device 2202, UE) in accordance with examples as disclosed herein. The positioning manager 2204 and/or other device components may be configured as or otherwise support an apparatus, such as UE, including a receiver to: receive first control signaling indicating position information associated with a non-terrestrial station, the position information comprising one or more of an altitude of the non-terrestrial station, a distance between the non-terrestrial station and the apparatus, or an indication of a timing delay between the non-terrestrial station and the apparatus; receive second control signaling indicating a first configuration identifying a first reference signal occasion; a positioning manager to determine a temporal range of an expected reference signal time difference duration based in part on the position information and the first configuration; and the receiver to receive a reference signal during the temporal range of the expected reference signal time difference duration.

Additionally, the apparatus (e.g., a UE) includes any one or combination of: the positioning manager is configured to identify a temporal offset associated with a reference period of the non-terrestrial station based in part on the first configuration, and wherein the temporal offset is added to the timing delay. The positioning manager is configured to adjust the expected reference signal time difference duration according to a non-terrestrial network architecture that includes a terrestrial network transmission-reception point and a non-terrestrial network transmission point, one or both of the terrestrial network transmission-reception point or the non-terrestrial network transmission point being a primary transmission-reception point or a secondary transmission-reception point. The expected reference signal time difference duration is determined based in part on a primary transmission-reception point and a secondary transmission-reception point signaling intra-frequency. The expected reference signal time difference duration is determined based in part on a primary transmission-reception point and a secondary transmission-reception point signaling inter-frequency. The receiver is configured to receive third control signaling indicating a second configuration identifying a second reference signal occasion; and the positioning manager is configured to determine the temporal range of the expected reference signal time difference duration further based in part on the second configuration. The receiver is configured to: receive third control signaling indicating additional position information associated with at least another non-terrestrial station; receive fourth control signaling indicating a second configuration identifying at least a second reference signal occasion; and the positioning manager is configured to determine the temporal range of the expected reference signal time difference duration based in part on the position information, the additional position information, the first configuration information, and the second configuration. The positioning manager is configured to: perform a measurement on the reference signal to determine a Doppler frequency of the reference signal based in part on the position information associated with the non-terrestrial station; and obtain an estimate of a position of the apparatus with respect to the non-terrestrial station based on the Doppler frequency. The positioning manager is configured to: determine an estimated distance between the non-terrestrial station and the apparatus based on multi-round trip time measurements; and obtain the distance between the non-terrestrial station and the apparatus based on the estimated distance and the position information associated with the non-terrestrial station.

The positioning manager 2204 and/or other device components may be configured as or otherwise support an apparatus, such as UE, including a receiver to: receive a reference signal lacking Doppler pre-compensation; receive control signaling indicating position information associated with a non-terrestrial station, the position information comprising one or more of a location of the non-terrestrial station, a velocity of the non-terrestrial station, or a distance between the non-terrestrial station and the apparatus; a positioning manager to: determine a Doppler frequency of the reference signal based in part on the position information associated with the non-terrestrial station; and obtain an estimate of a position of the apparatus with respect to the non-terrestrial station based in part on the determined Doppler frequency.

Additionally, the apparatus (e.g., a UE) includes any one or combination of: the positioning manager is configured to obtain the estimate of the position of the apparatus by at least one of: determine the estimate of the position of the apparatus with respect to the non-terrestrial station based on the determined Doppler frequency; or receive the estimate of the position of the apparatus with respect to the non-terrestrial station based on the determined Doppler frequency. The positioning manager is configured to: determine a Doppler-shifted frequency based in part on the velocity of the non-terrestrial station traveling in a direction at an angle relative to a line along the distance between the non-terrestrial station and the apparatus; and obtain the estimate of the position of the apparatus with respect to the non-terrestrial station based on the determined Doppler-shifted frequency.

The positioning manager 2204 and/or other device components may be configured as or otherwise support a means for positioning at a user equipment, including receiving first control signaling indicating position information associated with a non-terrestrial station, the position information comprising one or more of an altitude of the non-terrestrial station, a distance between the non-terrestrial station and the user equipment, or an indication of a timing delay between the non-terrestrial station and the user equipment; receiving second control signaling indicating a first configuration identifying a first reference signal occasion; determining a temporal range of an expected reference signal time difference duration based in part on the position information and the first configuration; and receiving a reference signal during the temporal range of the expected reference signal time difference duration.

Additionally, wireless communication at the user equipment includes any one or combination of: identifying a temporal offset associated with a reference period of the non-terrestrial station based in part on the first configuration, wherein the temporal offset is added to the timing delay. The method further comprising adjusting the expected reference signal time difference duration according to a non-terrestrial network architecture that includes a terrestrial network transmission-reception point and a non-terrestrial network transmission point, one or both of the terrestrial network transmission-reception point or the non-terrestrial network transmission point being a primary transmission-reception point or a secondary transmission-reception point. The expected reference signal time difference duration is determined based in part on a primary transmission-reception point and a secondary transmission-reception point signaling intra-frequency. The expected reference signal time difference duration is determined based in part on a primary transmission-reception point and a secondary transmission-reception point signaling inter-frequency. The method further comprising: receiving third control signaling indicating a second configuration identifying a second reference signal occasion; and wherein the determining the temporal range of the expected reference signal time difference duration is further based in part on the second configuration. The method further comprising: receiving third control signaling indicating additional position information associated with at least another non-terrestrial station; receiving fourth control signaling indicating a second configuration identifying at least a second reference signal occasion; and wherein the determining the temporal range of the expected reference signal time difference duration is based in part on the position information, the additional position information, the first configuration information, and the second configuration. The method further comprising: performing a measurement on the reference signal to determine a Doppler frequency of the reference signal based in part on the position information associated with the non-terrestrial station; and obtaining an estimate of a position of the user equipment with respect to the non-terrestrial station based on the Doppler frequency. The method further comprising: determining an estimated distance between the non-terrestrial station and the user equipment based on multi-round trip time measurements; and obtaining the distance between the non-terrestrial station and the user equipment based on the estimated distance and the position information associated with the non-terrestrial station.

The positioning manager 2204 and/or other device components may be configured as or otherwise support a means for positioning at a user equipment, including receiving a reference signal lacking Doppler pre-compensation; receiving control signaling indicating position information associated with a non-terrestrial station, the position information comprising one or more of a location of the non-terrestrial station, a velocity of the non-terrestrial station, or a distance between the non-terrestrial station and the user equipment; determining a Doppler frequency of the reference signal based in part on the position information associated with the non-terrestrial station; and obtaining an estimate of a position of the user equipment with respect to the non-terrestrial station based in part on the determined Doppler frequency.

Additionally, wireless communication at the user equipment includes any one or combination of: the user equipment obtaining the estimate of the position of the user equipment by one of: determining the estimate of the position of the user equipment with respect to the non-terrestrial station based on the determined Doppler frequency; or receiving the estimate of the position of the user equipment with respect to the non-terrestrial station based on the determined Doppler frequency. The method further comprising: determining a Doppler-shifted frequency based in part on the velocity of the non-terrestrial station traveling in a direction at an angle relative to a line along the distance between the non-terrestrial station and the user equipment; and obtaining the estimate of the position of the user equipment with respect to the non-terrestrial station based on the determined Doppler-shifted frequency.

The processor 2206 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some implementations, the processor 2206 may be configured to operate a memory array using a memory controller. In some other implementations, a memory controller may be integrated into the processor 2206. The processor 2206 may be configured to execute computer-readable instructions stored in a memory (e.g., the memory 2208) to cause the device 2202 to perform various functions of the present disclosure.

The memory 2208 may include random access memory (RAM) and read-only memory (ROM). The memory 2208 may store computer-readable, computer-executable code including instructions that, when executed by the processor 2206 cause the device 2202 to perform various functions described herein. The code may be stored in a non-transitory computer-readable medium such as system memory or another type of memory. In some implementations, the code may not be directly executable by the processor 2206 but may cause a computer (e.g., when compiled and executed) to perform functions described herein. In some implementations, the memory 2208 may include, among other things, a basic I/O system (BIOS) which may control basic hardware or software operation such as the interaction with peripheral components or devices.

The I/O controller 2214 may manage input and output signals for the device 2202. The I/O controller 2214 may also manage peripherals not integrated into the device 2202. In some implementations, the I/O controller 2214 may represent a physical connection or port to an external peripheral. In some implementations, the I/O controller 2214 may utilize an operating system such as iOS®, ANDROID®, MS-DOS®, MS-WINDOWS®, OS/2®, UNIX®, LINUX®, or another known operating system. In some implementations, the I/O controller 2214 may be implemented as part of a processor, such as the processor 2206. In some implementations, a user may interact with the device 2202 via the I/O controller 2214 or via hardware components controlled by the I/O controller 2214.

In some implementations, the device 2202 may include a single antenna 2216. However, in some other implementations, the device 2202 may have more than one antenna 2216, which may be capable of concurrently transmitting or receiving multiple wireless transmissions. The receiver 2210 and the transmitter 2212 may communicate bi-directionally, via the one or more antennas 2216, wired, or wireless links as described herein. For example, the receiver 2210 and the transmitter 2212 may represent a wireless transceiver and may communicate bi-directionally with another wireless transceiver. The transceiver may also include a modem to modulate the packets, to provide the modulated packets to one or more antennas 2216 for transmission, and to demodulate packets received from the one or more antennas 2216.

Figure 23:
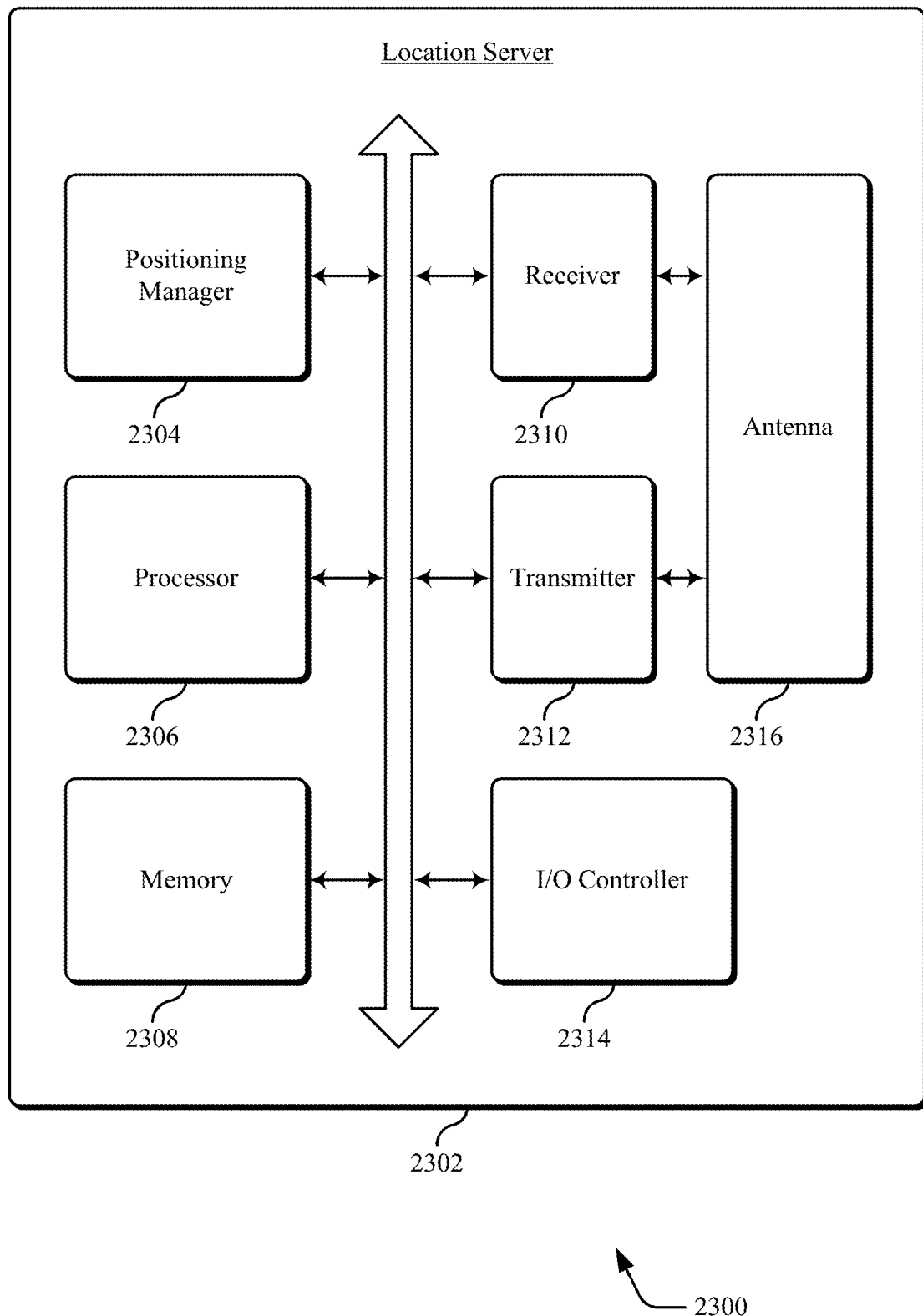
FIG. 23 illustrates an example block diagram of components of a location server that supports positioning in an NTN in accordance with aspects of the present disclosure.

FIG. 23 illustrates an example of a block diagram 2300 of a device 2302 that supports positioning in an NTN in accordance with aspects of the present disclosure. The device 2302 may be an example of a location server as described herein. The device 2302 may support wireless communication, positioning, and/or network signaling with one or more base stations 102, UE 104, or any combination thereof. The device 2302 may include components for bi-directional communications including components for transmitting and receiving communications, such as a positioning manager 2304, a processor 2306, a memory 2308, a receiver 2310, a transmitter 2312, and an I/O controller 2314. These components may be in electronic communication or otherwise coupled (e.g., operatively, communicatively, functionally, electronically, electrically) via one or more interfaces (e.g., buses).

The positioning manager 2304, the receiver 2310, the transmitter 2312, or various combinations thereof or various components thereof may be examples of means for performing various aspects of the present disclosure as described herein. For example, the positioning manager 2304, the receiver 2310, the transmitter 2312, or various combinations or components thereof may support a method for performing one or more of the functions described herein.

In some implementations, the positioning manager 2304, the receiver 2310, the transmitter 2312, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some implementations, the processor 2306 and the memory 2308 coupled with the processor 2306 may be configured to perform one or more of the functions described herein (e.g., by executing, by the processor 2306, instructions stored in the memory 2308).

Additionally or alternatively, in some implementations, the positioning manager 2304, the receiver 2310, the transmitter 2312, or various combinations or components thereof may be implemented in code (e.g., as communications management software or firmware) executed by the processor 2306. If implemented in code executed by the processor 2306, the functions of the positioning manager 2304, the receiver 2310, the transmitter 2312, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some implementations, the positioning manager 2304 may be configured to perform various operations (e.g., receiving, monitoring, transmitting) using or otherwise in cooperation with the receiver 2310, the transmitter 2312, or both. For example, the positioning manager 2304 may receive information from the receiver 2310, send information to the transmitter 2312, or be integrated in combination with the receiver 2310, the transmitter 2312, or both to receive information, transmit information, or perform various other operations as described herein. Although the positioning manager 2304 is illustrated as a separate component, in some implementations, one or more functions described with reference to the positioning manager 2304 may be supported by or performed by the processor 2306, the memory 2308, or any combination thereof. For example, the memory 2308 may store code, which may include instructions executable by the processor 2306 to cause the device 2302 to perform various aspects of the present disclosure as described herein, or the processor 2306 and the memory 2308 may be otherwise configured to perform or support such operations.

For example, the positioning manager 2304 may support wireless communication at a first device (e.g., the location server as device 2302) in accordance with examples as disclosed herein. The positioning manager 2304 and/or other device components may be configured as or otherwise support an apparatus, such as a location server, including a receiver to: receive first control signaling indicating first configuration information in a downlink reference signal associated with a non-terrestrial station; receive second control signaling indicating second configuration information in an uplink reference signal associated with a user equipment; receive third control signaling indicating a first configuration of a propagation delay and a delay drift rate associated with a timing delay of the positioning signaling between the non-terrestrial station and the user equipment; receive a first reference signal at a reception time; a positioning manager to obtain a transmission time based in part on the reception time of the first reference signal, the propagation delay, and the delay drift rate; and a transmitter to transmit the uplink reference signal to the non-terrestrial station at the transmission time.

The positioning manager 2304 and/or other device components may be configured as or otherwise support a means for positioning signaling at a location server, including receiving first control signaling indicating first configuration information in a downlink reference signal associated with a non-terrestrial station; receiving second control signaling indicating second configuration information in an uplink reference signal associated with a user equipment; receiving third control signaling indicating a first configuration of a propagation delay and a delay drift rate associated with a timing delay of the positioning signaling between the non-terrestrial station and the user equipment; receiving a first reference signal at a reception time; obtaining a transmission time based in part on the reception time of the first reference signal, the propagation delay, and the delay drift rate; and transmitting the uplink reference signal to the non-terrestrial station at the transmission time.

The positioning manager 2304 may support wireless communication at an apparatus (e.g., the location server as device 2302) in accordance with examples as disclosed herein. The positioning manager 2304 and/or other device components may be configured as or otherwise support an apparatus, such as a location server, including a receiver to receive position information comprising one or more of an altitude of a non-terrestrial station and a distance between the non-terrestrial station and a location associated with a user equipment (UE); a positioning manager to determine a temporal range of an expected reference signal time difference duration associated with a first reference signal occasion based in part on the position information; and a transmitter to transmit at least one configuration comprising first information of the first reference signal occasion and second information of the expected reference signal time difference duration.

Additionally, the apparatus (e.g., a location server) includes any one or combination of: the positioning manager adjusts the expected reference signal time difference duration according to a non-terrestrial network architecture that includes a terrestrial network transmission-reception point and a non-terrestrial network transmission point, one or both of the terrestrial network transmission-reception point or the non-terrestrial network transmission point being a primary transmission-reception point or a secondary transmission-reception point. The expected reference signal time difference duration is determined based in part on a primary transmission-reception point and a secondary transmission-reception point signaling intra-frequency.

The processor 2306 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some implementations, the processor 2306 may be configured to operate a memory array using a memory controller. In some other implementations, a memory controller may be integrated into the processor 2306. The processor 2306 may be configured to execute computer-readable instructions stored in a memory (e.g., the memory 2308) to cause the device 2302 to perform various functions of the present disclosure.

The memory 2308 may include random access memory (RAM) and read-only memory (ROM). The memory 2308 may store computer-readable, computer-executable code including instructions that, when executed by the processor 2306 cause the device 2302 to perform various functions described herein. The code may be stored in a non-transitory computer-readable medium such as system memory or another type of memory. In some implementations, the code may not be directly executable by the processor 2306 but may cause a computer (e.g., when compiled and executed) to perform functions described herein. In some implementations, the memory 2308 may include, among other things, a basic I/O system (BIOS) which may control basic hardware or software operation such as the interaction with peripheral components or devices.

The I/O controller 2314 may manage input and output signals for the device 2302. The I/O controller 2314 may also manage peripherals not integrated into the device 2302. In some implementations, the I/O controller 2314 may represent a physical connection or port to an external peripheral. In some implementations, the I/O controller 2314 may utilize an operating system such as iOS®, ANDROID®, MS-DOS®, MS-WINDOWS®, OS/2®, UNIX®, LINUX®, or another known operating system. In some implementations, the I/O controller 2314 may be implemented as part of a processor, such as the processor 2306. In some implementations, a user may interact with the device 2302 via the I/O controller 2314 or via hardware components controlled by the I/O controller 2314.

In some implementations, the device 2302 may include a single antenna 2316. However, in some other implementations, the device 2302 may have more than one antenna 2316, which may be capable of concurrently transmitting or receiving multiple wireless transmissions. The receiver 2310 and the transmitter 2312 may communicate bi-directionally, via the one or more antennas 2316, wired, or wireless links as described herein. For example, the receiver 2310 and the transmitter 2312 may represent a wireless transceiver and may communicate bi-directionally with another wireless transceiver. The transceiver may also include a modem to modulate the packets, to provide the modulated packets to one or more antennas 2316 for transmission, and to demodulate packets received from the one or more antennas 2316.

Figure 24:
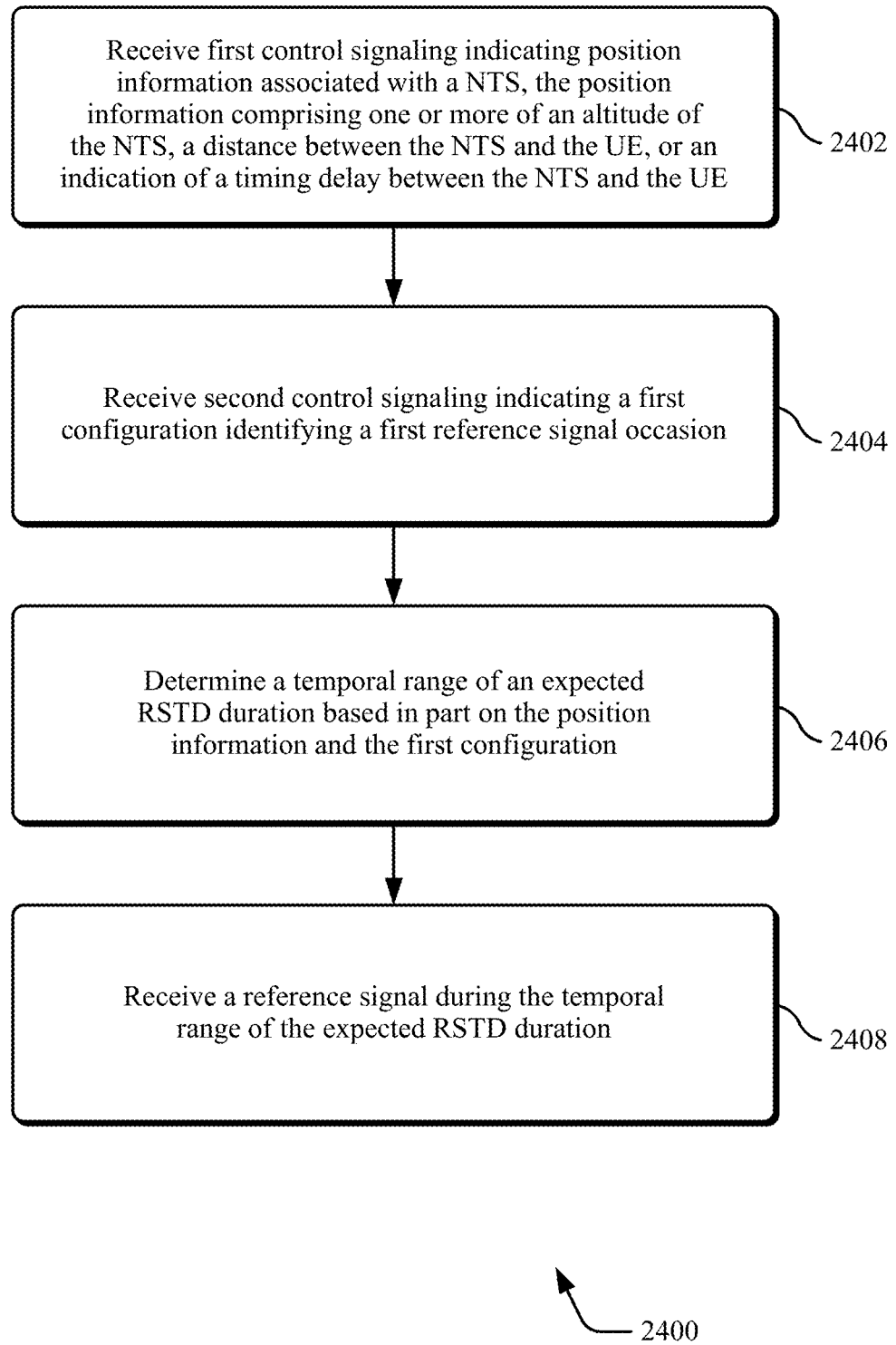
FIGS. 24-26 illustrate flowcharts of methods that support positioning in an NTN in accordance with aspects of the present disclosure.

FIG. 24 illustrates a flowchart of a method 2400 that supports positioning in an NTN in accordance with aspects of the present disclosure. The operations of the method 2400 may be implemented by a device or its components as described herein. For example, the operations of the method 2400 may be performed by a device, such as UE 104 as described with reference to FIGS. 1 through 23. In some implementations, the device may execute a set of instructions to control the function elements of the device to perform the described functions. Additionally, or alternatively, the device may perform aspects of the described functions using special-purpose hardware.

At 2402, the method may include receiving first control signaling indicating position information associated with a NTS, the position information comprising one or more of an altitude of the NTS, a distance between the NTS and the UE, or an indication of a timing delay between the NTS and the UE. The operations of 2402 may be performed in accordance with examples as described herein. In some implementations, aspects of the operations of 2402 may be performed by a device as described with reference to FIG. 1.

At 2404, the method may include receiving second control signaling indicating a first configuration identifying a first reference signal occasion. The operations of 2404 may be performed in accordance with examples as described herein. In some implementations, aspects of the operations of 2404 may be performed by a device as described with reference to FIG. 1.

At 2406, the method may include determining a temporal range of an expected RSTD duration based in part on the position information and the first configuration. The operations of 2406 may be performed in accordance with examples as described herein. In some implementations, aspects of the operations of 2406 may be performed by a device as described with reference to FIG. 1.

At 2408, the method may include receiving a reference signal during the temporal range of the expected RSTD duration. The operations of 2408 may be performed in accordance with examples as described herein. In some implementations, aspects of the operations of 2408 may be performed by a device as described with reference to FIG. 1.

Figure 25:
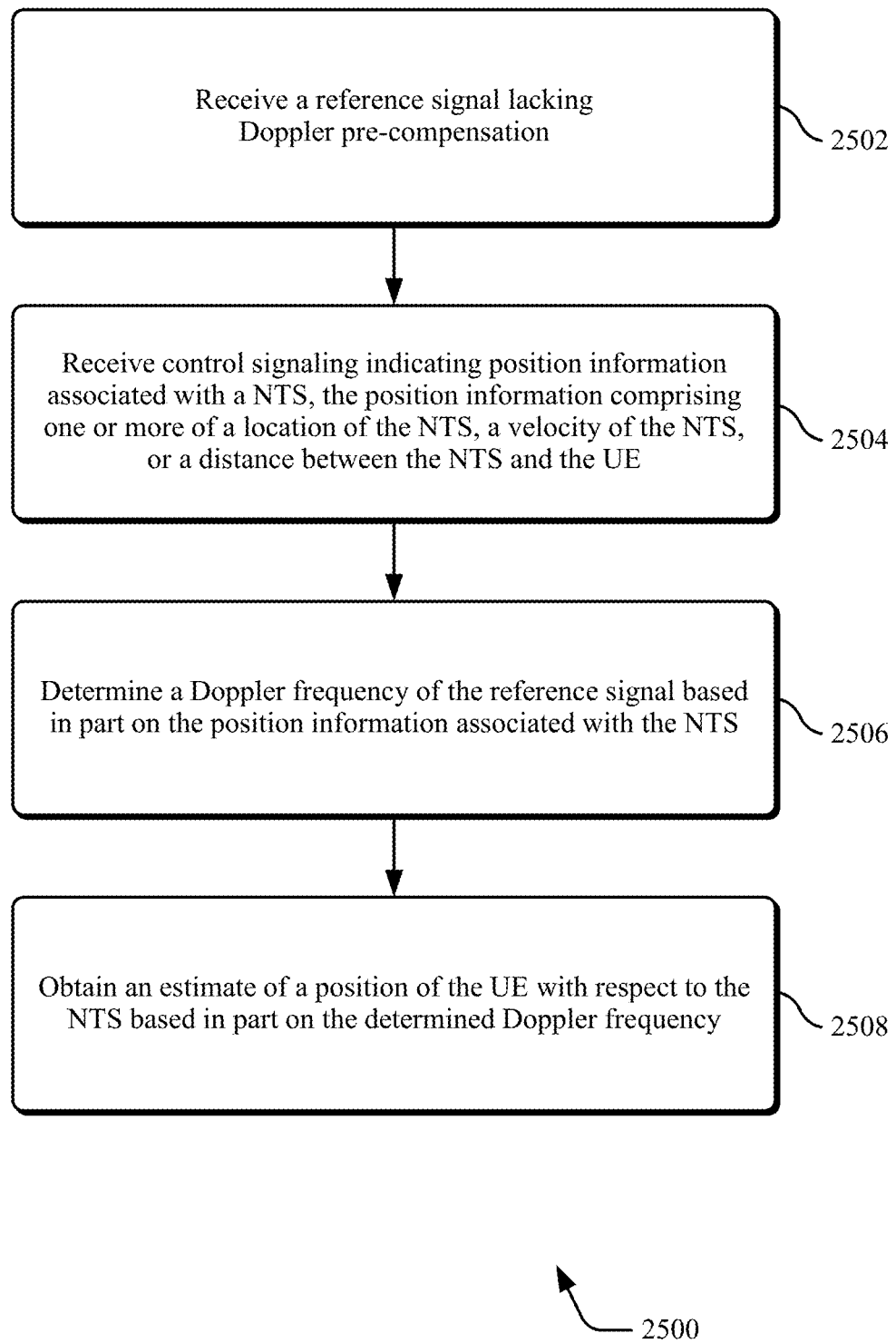

FIG. 25 illustrates a flowchart of a method 2500 that supports positioning in an NTN in accordance with aspects of the present disclosure. The operations of the method 2500 may be implemented by a device or its components as described herein. For example, the operations of the method 2500 may be performed by a device, such as UE 104 as described with reference to FIGS. 1 through 23. In some implementations, the device may execute a set of instructions to control the function elements of the device to perform the described functions. Additionally, or alternatively, the device may perform aspects of the described functions using special-purpose hardware.

At 2502, the method may include receiving a reference signal lacking Doppler pre-compensation. The operations of 2502 may be performed in accordance with examples as described herein. In some implementations, aspects of the operations of 2502 may be performed by a device as described with reference to FIG. 1.

At 2504, the method may include receiving control signaling indicating position information associated with a NTS, the position information comprising one or more of a location of the NTS, a velocity of the NTS, or a distance between the NTS and the UE. The operations of 2504 may be performed in accordance with examples as described herein. In some implementations, aspects of the operations of 2504 may be performed by a device as described with reference to FIG. 1.

At 2506, the method may include determining a Doppler frequency of the reference signal based in part on the position information associated with the NTS. The operations of 2506 may be performed in accordance with examples as described herein. In some implementations, aspects of the operations of 2506 may be performed by a device as described with reference to FIG. 1.

At 2508, the method may include obtaining an estimate of a position of the UE with respect to the NTS based in part on the determined Doppler frequency. The operations of 2508 may be performed in accordance with examples as described herein. In some implementations, aspects of the operations of 2508 may be performed by a device as described with reference to FIG. 1.

Figure 26:
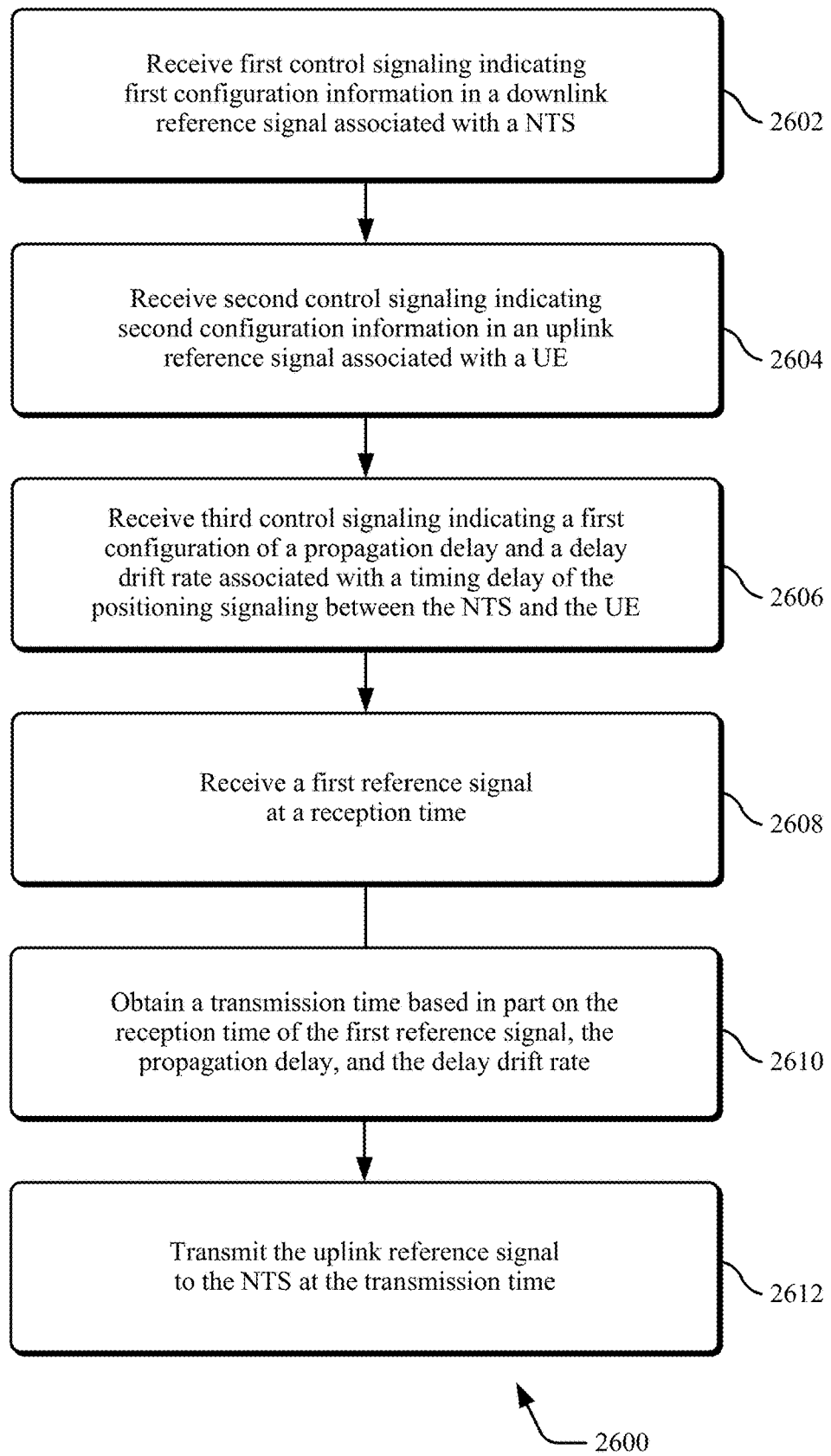

FIG. 26 illustrates a flowchart of a method 2600 that supports positioning in an NTN in accordance with aspects of the present disclosure. The operations of the method 2600 may be implemented by a device or its components as described herein. For example, the operations of the method 2600 may be performed by a location server as described with reference to FIGS. 1 through 23. In some implementations, the device may execute a set of instructions to control the function elements of the device to perform the described functions. Additionally, or alternatively, the device may perform aspects of the described functions using special-purpose hardware.

At 2602, the method may include receiving first control signaling indicating first configuration information in a downlink reference signal associated with a NTS. The operations of 2602 may be performed in accordance with examples as described herein. In some implementations, aspects of the operations of 2602 may be performed by a device as described with reference to FIG. 1.

At 2604, the method may include receiving second control signaling indicating second configuration information in an uplink reference signal associated with a UE. The operations of 2604 may be performed in accordance with examples as described herein. In some implementations, aspects of the operations of 2604 may be performed by a device as described with reference to FIG. 1.

At 2606, the method may include receiving third control signaling indicating a first configuration of a propagation delay and a delay drift rate associated with a timing delay of the positioning signaling between the NTS and the UE. The operations of 2606 may be performed in accordance with examples as described herein. In some implementations, aspects of the operations of 2606 may be performed by a device as described with reference to FIG. 1.

At 2608, the method may include receiving a first reference signal at a reception time. The operations of 2608 may be performed in accordance with examples as described herein. In some implementations, aspects of the operations of 2608 may be performed by a device as described with reference to FIG. 1.

At 2610, the method may include obtaining a transmission time based in part on the reception time of the first reference signal, the propagation delay, and the delay drift rate. The operations of 2610 may be performed in accordance with examples as described herein. In some implementations, aspects of the operations of 2610 may be performed by a device as described with reference to FIG. 1.

At 2612, the method may include transmitting the uplink reference signal to the NTS at the transmission time. The operations of 2612 may be performed in accordance with examples as described herein. In some implementations, aspects of the operations of 2612 may be performed by a device as described with reference to FIG. 1.

It should be noted that the methods described herein describe possible implementations, and that the operations and the steps may be rearranged or otherwise modified and that other implementations are possible. Further, aspects from two or more of the methods may be combined. The order in which the methods are described is not intended to be construed as a limitation, and any number or combination of the described method operations may be performed in any order to perform a method, or an alternate method.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor.

Any connection may be properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on. Further, as used herein, including in the claims, a "set" may include one or more elements.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form to avoid obscuring the concepts of the described example.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A user equipment (UE) for wireless communication, comprising:
   at least one memory; and
   at least one processor coupled with the at least one memory and configured to cause the UE to:
   receive first control signaling indicating an expected reference signal time difference duration and position information associated with a non-terrestrial station, the position information comprising one or more of an altitude of the non-terrestrial station, a distance between the non-terrestrial station and the UE, or a velocity of the non-terrestrial station;
   receive second control signaling indicating a reference signal occasion;
   obtain an updated expected reference signal time difference duration by adding a temporal offset to the expected reference signal time difference duration, wherein the temporal offset is associated with a reference period of the non-terrestrial station that is based at least in part on the reference signal occasion;
   receive a reference signal during a temporal range of the updated expected reference signal time difference duration;
   perform a measurement on the reference signal to determine a Doppler frequency of the reference signal based at least in part on the position information associated with the non-terrestrial station; and
   transmit, to a network equipment (NE) based at least in part on a capability of the UE, the temporal offset and the Doppler frequency, wherein an estimate of a position of the UE with respect to the non-terrestrial station is based at least in part on the Doppler frequency.

2. The UE of claim 1, wherein the at least one processor is further configured to cause the UE to adjust the expected reference signal time difference duration according to a non-terrestrial network (NTN) architecture that includes a terrestrial network (TN) transmission-reception point (TRP) and an NTN TRP, one or both of the TN TRP or the NTN TRP being a primary TRP or a secondary TRP.

3. The UE of claim 1, wherein the expected reference signal time difference duration is determined based at least in part on a primary transmission-reception point (TRP) and a secondary TRP signaling intra-frequency.

4. The UE of claim 1, wherein the expected reference signal time difference duration is determined based at least in part on a primary transmission-reception point (TRP) and a secondary TRP signaling inter-frequency.

5. The UE of claim 1, wherein the at least one processor is further configured to cause the UE to:
   receive third control signaling indicating an additional reference signal occasion; and
   determine the temporal range of the expected reference signal time difference duration based at least in part on the additional reference signal occasion.

6. The UE of claim 1, wherein the at least one processor is further configured to cause the UE to:
   receive third control signaling indicating additional position information associated with at least an additional non-terrestrial station;
   receive fourth control signaling indicating at least an additional reference signal occasion; and
   determine the temporal range of the expected reference signal time difference duration based at least in part on the position information, the additional position information, the reference signal occasion, and the additional reference signal occasion.

7. The UE of claim 1, wherein the at least one processor is further configured to cause the UE to:
   determine an estimated distance between the non-terrestrial station and the UE based at least in part on multi-round trip time measurements; and
   obtain the distance between the non-terrestrial station and the UE based at least in part on the estimated distance and the position information associated with the non-terrestrial station.

8. A network equipment (NE) for wireless communication, comprising:
at least one memory; and
at least one processor coupled with the at least one memory and configured to cause the NE to:
transmit first control signaling indicating an expected reference signal time difference duration and position information associated with a non-terrestrial station, the position information comprising one or more of an altitude of the non-terrestrial station, a velocity of the non-terrestrial station, or a distance between the non-terrestrial station and a user equipment (UE);
transmit second control signaling indicating a reference signal occasion, wherein an updated expected reference signal time difference duration comprises a sum of a temporal offset and the expected reference signal time difference duration, and wherein the temporal offset is associated with a reference period of the non-terrestrial station that is based at least in part on the reference signal occasion; and
receive, from the UE and based at least in part on a capability of the UE, the temporal offset and a Doppler frequency of a reference signal associated with a temporal range of the updated expected reference signal time difference duration, wherein the Doppler frequency of the reference signal is based at least in part on the position information associated with the non-terrestrial station, and wherein an estimate of a position of the UE with respect to the non-terrestrial station is based at least in part on the Doppler frequency.

9. The NE of claim 8, wherein the at least one processor is further configured to cause the NE to transmit third control signaling indicating an additional reference signal occasion, wherein the temporal range of the expected reference signal time difference duration based at least in part on the additional reference signal occasion.

10. The NE of claim 8, wherein the at least one processor is further configured to cause the NE to:
transmit third control signaling indicating additional position information associated with at least an additional non-terrestrial station; and
transmit fourth control signaling indicating at least an additional reference signal occasion, wherein the temporal range of the expected reference signal time difference duration based at least in part on the position information, the additional position information, the reference signal occasion, and the additional reference signal occasion.

11. A method performed by a user equipment (UE), the method comprising:
receiving first control signaling indicating an expected reference signal time difference duration and position information associated with a non-terrestrial station, the position information comprising one or more of an altitude of the non-terrestrial station, a distance between the non-terrestrial station and the UE, or a velocity of the non-terrestrial station;
receiving second control signaling indicating a reference signal occasion;
obtaining an updated expected reference signal time difference duration by adding a temporal offset to the expected reference signal time difference duration, wherein the temporal offset is associated with a reference period of the non-terrestrial station that is based at least in part on the reference signal occasion;
receiving a reference signal during a temporal range of the updated expected reference signal time difference duration;
performing a measurement on the reference signal to determine a Doppler frequency of the reference signal based at least in part on the position information associated with the non-terrestrial station; and
transmitting, to a network equipment (NE) based at least in part on a capability of the UE, the temporal offset and the Doppler frequency, wherein an estimate of a position of the UE with respect to the non-terrestrial station is based at least in part on the Doppler frequency.

12. The method of claim 11, further comprising:
adjusting the expected reference signal time difference duration according to a non-terrestrial network (NTN) architecture that includes a terrestrial network (TN) transmission-reception point (TRP) and an NTN TRP, one or both of the TN TRP or the NTN TRP being a primary TRP or a secondary TRP.

13. The method of claim 11, wherein the expected reference signal time difference duration is determined based at least in part on a primary transmission-reception point (TRP) and a secondary TRP signaling intra-frequency.

14. The method of claim 11, wherein the expected reference signal time difference duration is determined based at least in part on a primary transmission-reception point (TRP) and a secondary TRP signaling inter-frequency.

15. The method of claim 11, further comprising:
receiving third control signaling indicating an additional reference signal occasion, wherein the determining the temporal range of the expected reference signal time difference duration is based at least in part on the additional reference signal occasion.

16. The method of claim 11, further comprising:
receiving third control signaling indicating additional position information associated with at least an additional non-terrestrial station; and
receiving fourth control signaling indicating at least an additional reference signal occasion, wherein the determining the temporal range of the expected reference signal time difference duration is based at least in part on the position information, the additional position information, the reference signal occasion, and the additional reference signal occasion.

17. A processor for wireless communication, comprising:
at least one controller coupled with at least one memory and configured to cause the processor to:
receive first control signaling indicating an expected reference signal time difference duration and position information associated with a non-terrestrial station, the position information comprising one or more of an altitude of the non-terrestrial station, a distance between the non-terrestrial station and the processor, or a velocity of the non-terrestrial station;
receive second control signaling indicating a reference signal occasion;
obtain an updated expected reference signal time difference duration by adding a temporal offset to the expected reference signal time difference duration, wherein the temporal offset is associated with a reference period of the non-terrestrial station that is based at least in part on the reference signal occasion;
receive a reference signal during a temporal range of the updated expected reference signal time difference duration;

perform a measurement on the reference signal to determine a Doppler frequency of the reference signal based at least in part on the position information associated with the non-terrestrial station; and transmit, to a network equipment (NE) based at least in part on a capability of the processor, the temporal offset and the Doppler frequency, wherein an estimate of a position of the processor with respect to the non-terrestrial station is based at least in part on the Doppler frequency.

18. The processor of claim 17, wherein the at least one controller is further configured to cause the processor to adjust the expected reference signal time difference duration according to a non-terrestrial network (NTN) architecture that includes a terrestrial network (TN) transmission-reception point (TRP) and an NTN TRP, one or both of the TN TRP or the NTN TRP being a primary TRP or a secondary TRP.

19. The processor of claim 17, wherein the expected reference signal time difference duration is determined based at least in part on a primary transmission-reception point (TRP) and a secondary TRP signaling intra-frequency.

20. The processor of claim 17, wherein the expected reference signal time difference duration is determined based at least in part on a primary transmission-reception point (TRP) and a secondary TRP signaling inter-frequency.

* * * * *